US011067030B2

(12) United States Patent
Roth et al.

(10) Patent No.: US 11,067,030 B2
(45) Date of Patent: Jul. 20, 2021

(54) MODULAR CYLINDER HEAD FOR ENGINE BLOCKS

(71) Applicant: Autosales, Incorporated, Tallmadge, OH (US)

(72) Inventors: Cory M. Roth, Marshallville, OH (US); Brian S. Jenior, Atwater, OH (US)

(73) Assignee: AUTOSALES, INCORPORATED, Tallmadge, OH (US)

( * ) Notice: Subject to any disclaimer, the term of this patent is extended or adjusted under 35 U.S.C. 154(b) by 0 days.

(21) Appl. No.: 16/673,459

(22) Filed: Nov. 4, 2019

(65) Prior Publication Data
US 2021/0131376 A1 May 6, 2021

(51) Int. Cl.
| | |
|---|---|
| *F02F 1/40* | (2006.01) |
| *F01M 9/10* | (2006.01) |
| *F01M 1/06* | (2006.01) |
| *B60W 20/15* | (2016.01) |
| *B60R 17/00* | (2006.01) |
| *F01L 1/18* | (2006.01) |
| *F01M 1/08* | (2006.01) |

(52) U.S. Cl.
CPC ............... *F02F 1/40* (2013.01); *B60R 17/00* (2013.01); *B60W 20/15* (2016.01); *F01M 1/06* (2013.01); *F01M 9/10* (2013.01); *F01M 9/107* (2013.01); *F01L 1/18* (2013.01); *F01L 2810/02* (2013.01); *F01M 2001/083* (2013.01)

(58) Field of Classification Search
CPC ..................................... F02F 1/40; F01L 1/18
USPC ........................................................ 123/193.5
See application file for complete search history.

(56) References Cited

U.S. PATENT DOCUMENTS

| 4,537,166 | A | * | 8/1985 | Kimura | .................... | F01L 1/053 |
| | | | | | | 123/90.27 |
| 6,332,441 | B1 | * | 12/2001 | Sugiyama | ................. | F01L 1/02 |
| | | | | | | 123/195 C |
| 2002/0035982 | A1 | * | 3/2002 | Kobayashi | ................ | F01L 1/02 |
| | | | | | | 123/196 M |
| 2013/0239916 | A1 | * | 9/2013 | Strusch | ..................... | F01L 1/26 |
| | | | | | | 123/90.1 |
| 2016/0123193 | A1 | * | 5/2016 | Patterson | ................ | F01L 1/146 |
| | | | | | | 123/90.16 |

* cited by examiner

*Primary Examiner* — Joseph J Dallo
*Assistant Examiner* — Yi-Kai Wang

(57) ABSTRACT

A modular cylinder head is configured for use with combustion engine block configurations each having different valvetrain oiling pathways. Thus, when used with "LA-style" engine blocks, oil receiving/delivery ports provided by the cylinder head are compatibly interfaced with an oil outlet port provided by the engine block, thus allowing oil to pass from the engine block into the head for delivery to a valvetrain carried thereby. Alternatively, when the head is used with "Magnum-style" engine blocks, the oil receiving/delivery ports of the head are not used. Rather, a pushrod and lifter having internal ports are used by the cylinder head to allow oil to pass from the engine block, through the internal ports of the lifter and pushrod, and into the valvetrain.

25 Claims, 29 Drawing Sheets

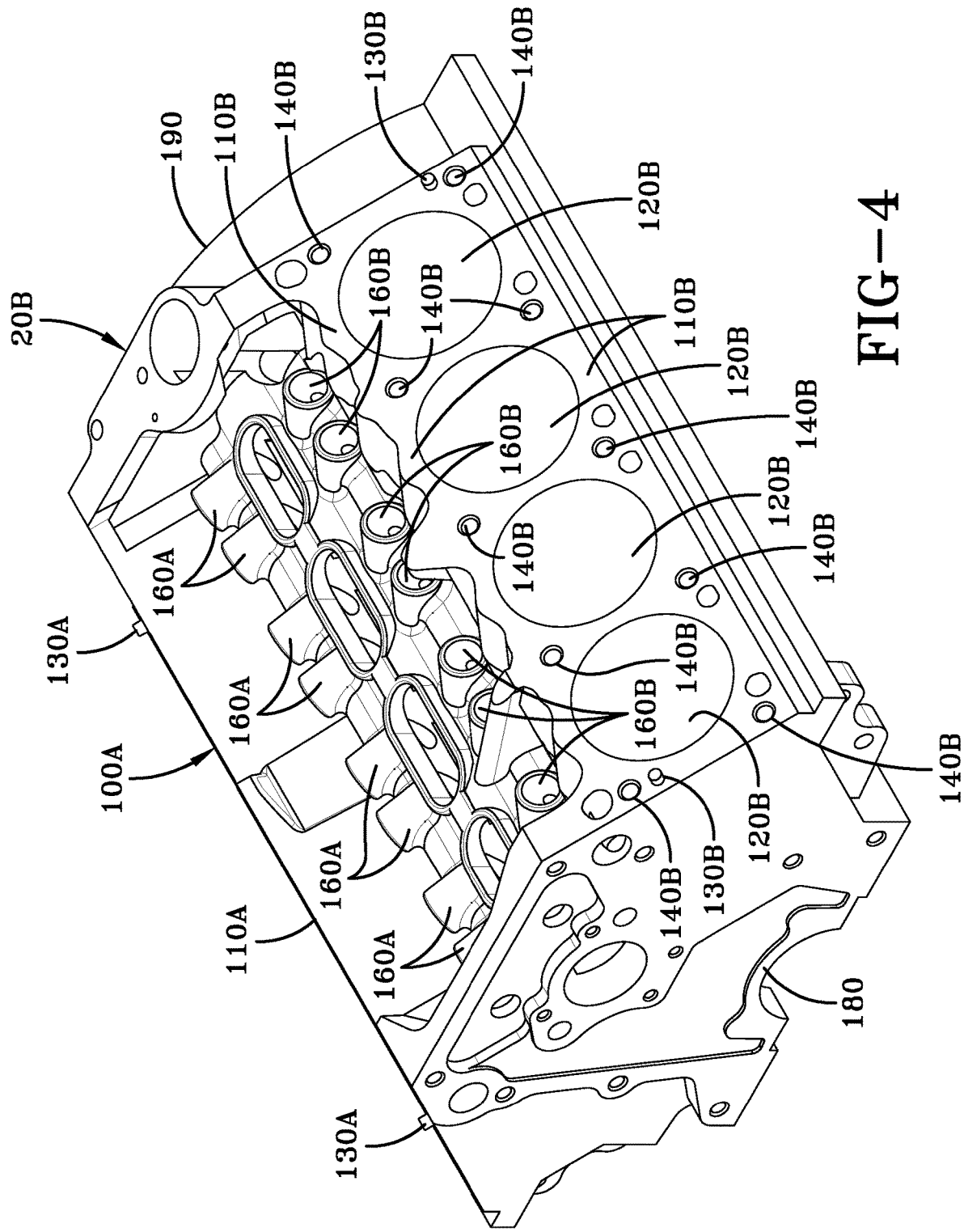

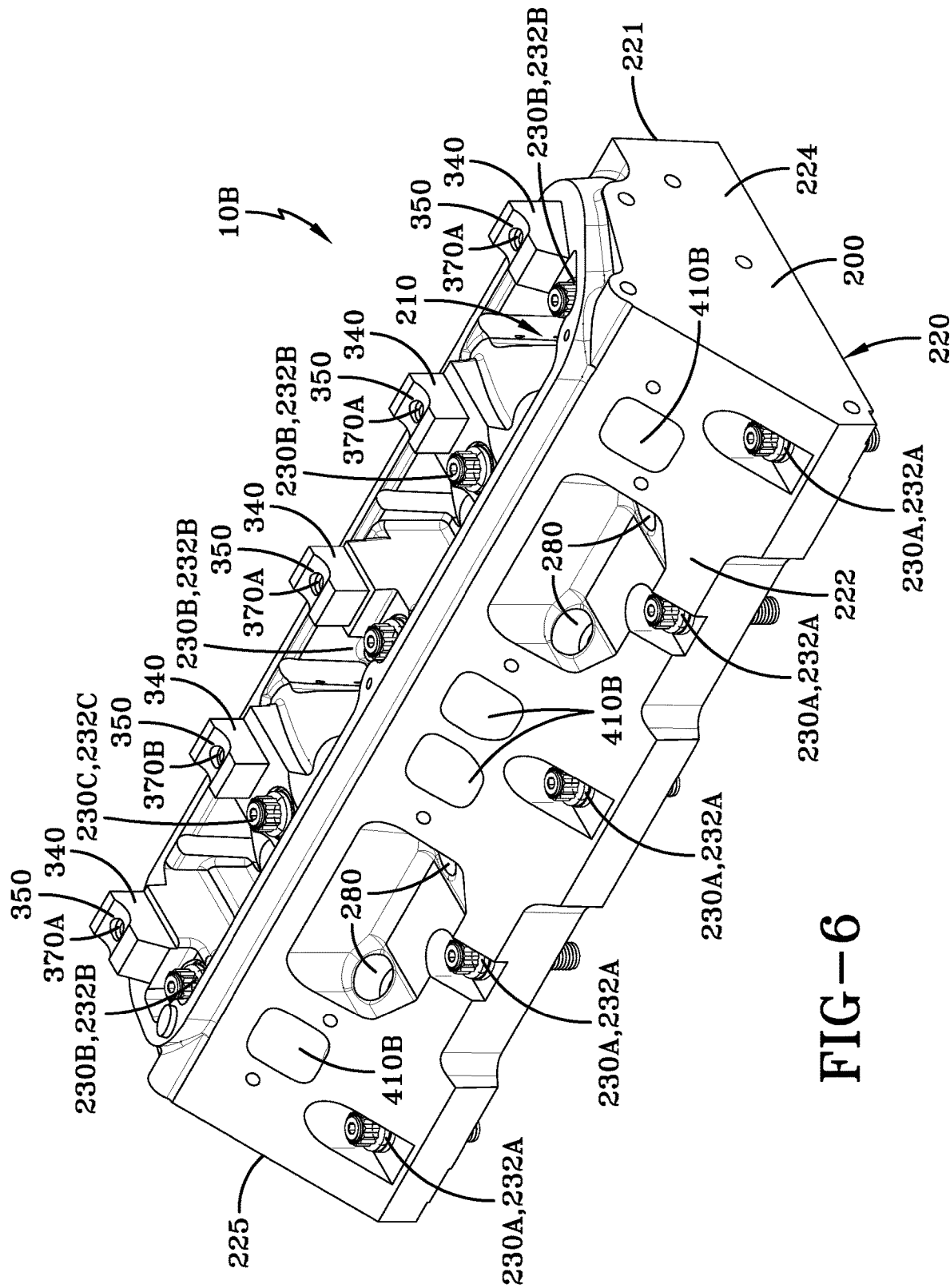

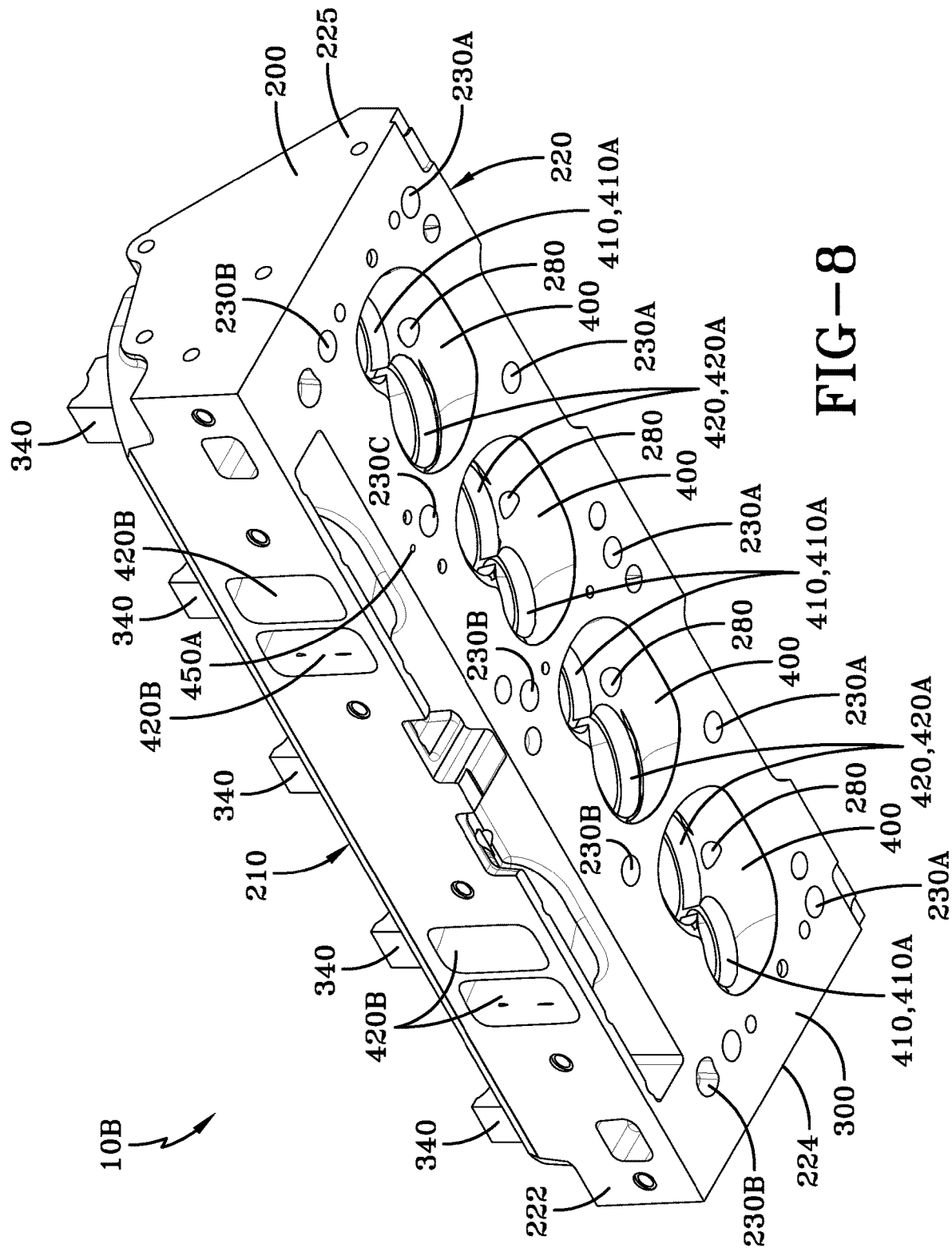

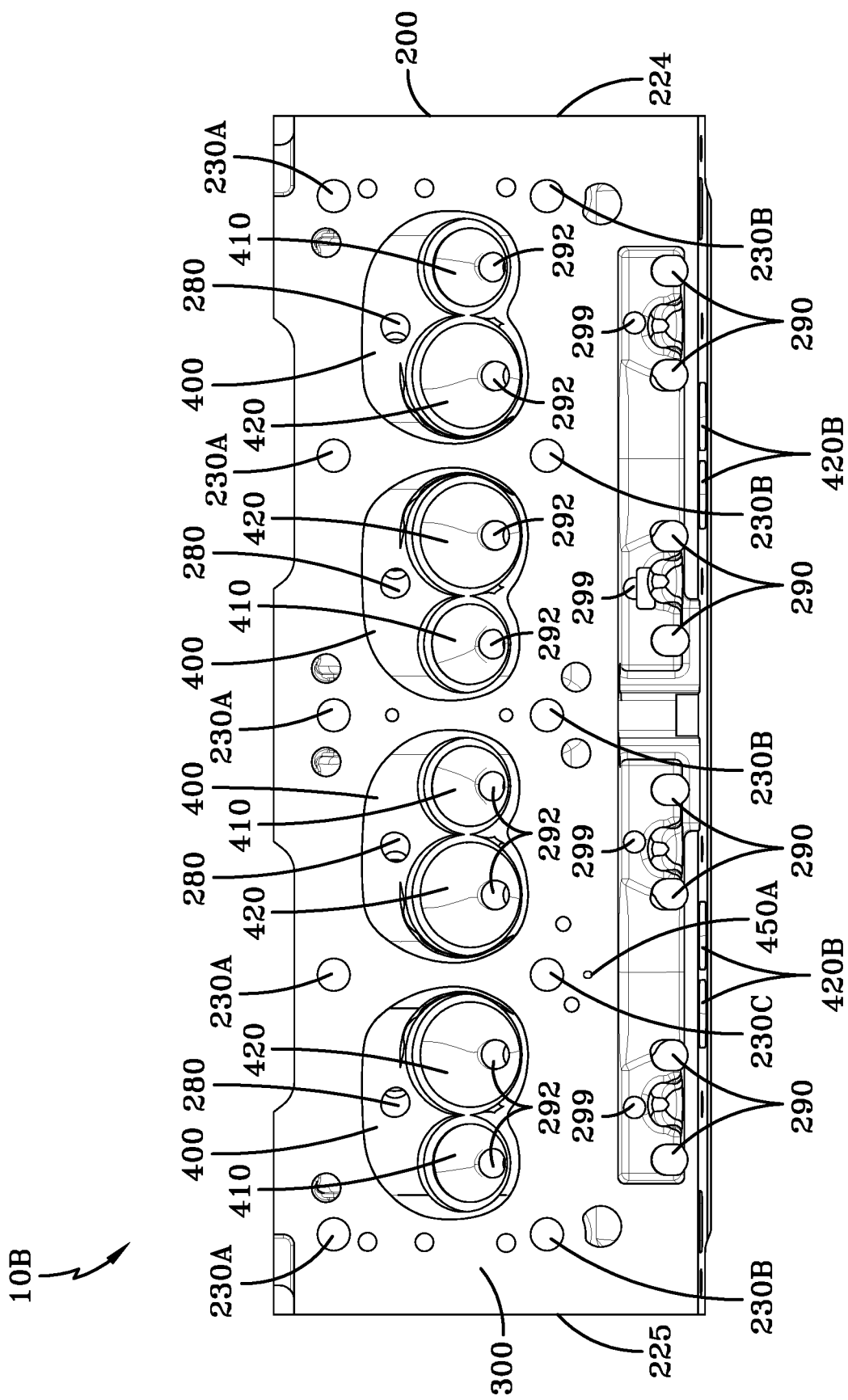

MODULAR CYLINDER HEAD FOR ENGINE BLOCKS

TECHNICAL FIELD

The various embodiments disclosed herein relate to combustion engines. In particular, the various embodiments disclosed herein relate to cylinder heads for combustion engines. More particularly, the various embodiments disclosed herein relate to a modular cylinder head that can be utilized with a plurality of combustion engine blocks each having different valvetrain oiling paths.

BACKGROUND

Combustion engines, such as automotive engines, are often modified from their stock configuration to improve their performance, including their horsepower and/or torque output. To achieve these performance gains, the OEM (original equipment manufacturer) cylinder head of the engine is replaced with an aftermarket cylinder head, which has been modified in various manners, such as through a porting process, to improve the flow of fresh air into an intake port for delivery to the combustion chamber and to improve the flow of resultant combusted exhaust gases out of the combustion chamber through an exhaust port. In other words, the modified intake and exhaust ports of the aftermarket head have been modified so that the amount of airflow through the combustion chamber is increased. The increased airflow results in enhanced engine performance, including increased horsepower and/or torque, which is highly sought after by automotive enthusiasts seeking increased performance from their vehicles. In addition, other manners for modifying the cylinder head may also be employed to enhance the performance of the engine to which the head is attached.

Many engine manufacturers, such as the MOPAR brand, have developed different engine blocks to accommodate various automotive design constraints, such as vehicle size, cost, and performance. These engine blocks include different pathways to route the flow of cooling and lubricating oil through the engine block so that it can be delivered to a valvetrain carried by the cylinder head. Thus, because the oiling pathways differ between each of the engine block designs, the OEM heads associated with each of these different engine blocks also differ in how they receive the oil from the engine blocks, or other oil supplying reservoir, for supply or routing to a valvetrain.

Thus, in the case where an aftermarket manufacturer desires to provide a modified cylinder head with improved performance, they must make separate heads for each different engine block variation. Such an endeavor is costly and time consuming, and reduces an aftermarket manufacturer's interest and ability in overcoming the barriers for entering into such a market. As a result, customers desiring to modify the performance of their combustion engines are prohibited from doing so given the unavailability of an aftermarket head Therefore, it would be desirable to have a single modular cylinder head configuration that can be utilized with multiple engine block designs, each having a different valvetrain oiling pathway configuration, so that economies of scale in the manufacture of the cylinder head can be achieved to reduce its overall cost.

SUMMARY

It is one aspect of the various embodiments disclosed herein to provide a cylinder head for an engine block having an oil outlet port disposed in a cylinder bank face, the cylinder head including a cylinder head having a combustion side configured to be placed adjacent to the cylinder bank of the engine block and a valve side adapted to carry a valvetrain, wherein a receiving opening is disposed in the combustion side of the head, the receiving opening adapted to be interfaced with the oil outlet port of the engine block to receive lubricating fluid therefrom; a rocker shaft mounting bore disposed in the cylinder head, the rocker shaft mounting bore having a delivery opening disposed therein; a head mounting bore disposed through the cylinder head; a receiving port fluidly connecting the receiving opening to the head mounting bore; and a delivery port fluidly connecting the head mounting bore to the delivery opening in the rocker shaft mounting bore.

It is another aspect of the various embodiments disclosed herein to provide a cylinder head for an engine block that includes a cylinder head having a combustion side configured to be placed adjacent to a cylinder bank of the engine block and a valve side adapted to carry a valvetrain, wherein a receiving opening is disposed in the combustion side of the head; a rocker shaft mounting bore disposed in the cylinder head, the rocker shaft mounting bore having a delivery opening disposed therein; a head mounting bore disposed through the cylinder head; a receiving port fluidly connecting the receiving opening to the head mounting bore; and a delivery port fluidly connecting the head mounting bore to the delivery opening in the rocker shaft mounting bore.

It is still another aspect of the various embodiments disclosed herein to provide a cylinder head kit for an engine block including a cylinder head, including a combustion side configured to be placed adjacent to a cylinder bank of the engine block and a valve side adapted to carry a valvetrain, wherein a receiving opening is disposed in the combustion side of the head; a rocker shaft mounting bore disposed in the cylinder head, the rocker shaft mounting bore having a delivery opening disposed therein; a head mounting bore disposed through the cylinder head; a receiving port fluidly connecting the receiving opening to the head mounting bore; and a delivery port fluidly connecting the head mounting bore to the delivery opening in the rocker shaft mounting bore; wherein the head mounting bore is configured to receive a head bolt, such that when the head bolt is received therein, the head mounting bore and the head bolt form a head passage therebetween that fluidly couples the receiving port and the delivery port; and wherein the rocker shaft mounting bore is configured to receive a rocker shaft bolt, such that when the rocker shaft bolt is received therein, the rocker shaft mounting bore and the rocker shaft bolt form a rocker outlet passage therebetween that is in fluid communication with the delivery opening; a rocker shaft having an elongated cavity extending therethrough, the cavity in fluid communication with one or more outlet apertures, a rocker shaft mounting aperture disposed through the rocker shaft and configured to receive the rocker shaft bolt for attachment to the rocker shaft mounting bore, wherein the rocker shaft mounting aperture and the rocker shaft bolt form a rocker inlet passage therebetween that is in fluid communication with the elongated cavity, and that is in fluid communication with the rocker outlet passage; a first rocker arm having a first body including a sleeve configured to pivotably receive the rocker shaft, and a port having a first opening and a second opening, wherein the first opening is disposed in the sleeve, and the second opening opens to an outside of the rocker arm, the first rocker arm including a first receiving aperture disposed in the first body; a first pushrod pivot member configured to be received with the first receiving aperture, the first pushrod pivot member adapted to be placed in operative communication with a pushrod; a second rocker arm having a second body including a sleeve configured to pivotably receive the rocker shaft, and a port having a first opening and a second opening, wherein the first opening is disposed in the sleeve, and the second opening is disposed in a second receiving aperture disposed in the second body of the second rocker arm; a second pushrod pivot member configured to be received within the second receiving aperture, the second pushrod pivot member having a pivot end, the pushrod pivot member having a port that fluidly couples an opening disposed in the pivot end to an opening that opens to outside of the second pushrod pivot member body so as to be in fluid communication with the second opening of the second rocker arm; a lifter having at least one inlet in fluid communication with at least one outlet, the at least one outlet disposed in a lifting surface; and a pushrod having a cavity that extends between a first opening and a second opening disposed in respective ends of the pushrod, wherein one of the outlets of the lifter is configured to be placed adjacent to the first opening of the pushrod, and wherein the pushrod is adapted to be placed in operative communication with the pivot end of the second pushrod pivot member.

BRIEF DESCRIPTION OF THE DRAWINGS

These and other features and advantages of the various embodiments disclosed herein will become better understood with regard to the following description, appended claims, and accompanying drawings, wherein:

FIG. 4 is a perspective view of the "Magnum-style" engine block;

FIG. 6 is a top perspective view of the modular cylinder head in accordance with the concepts of the various embodiments disclosed herein;

FIG. 8 is a bottom perspective view of the modular cylinder head in accordance with the concepts of the various embodiments disclosed herein;

FIG. 9 is a bottom plan view of the modular cylinder head in accordance with the concepts of the various embodiments disclosed herein;

DETAILED DESCRIPTION

Figure 5:
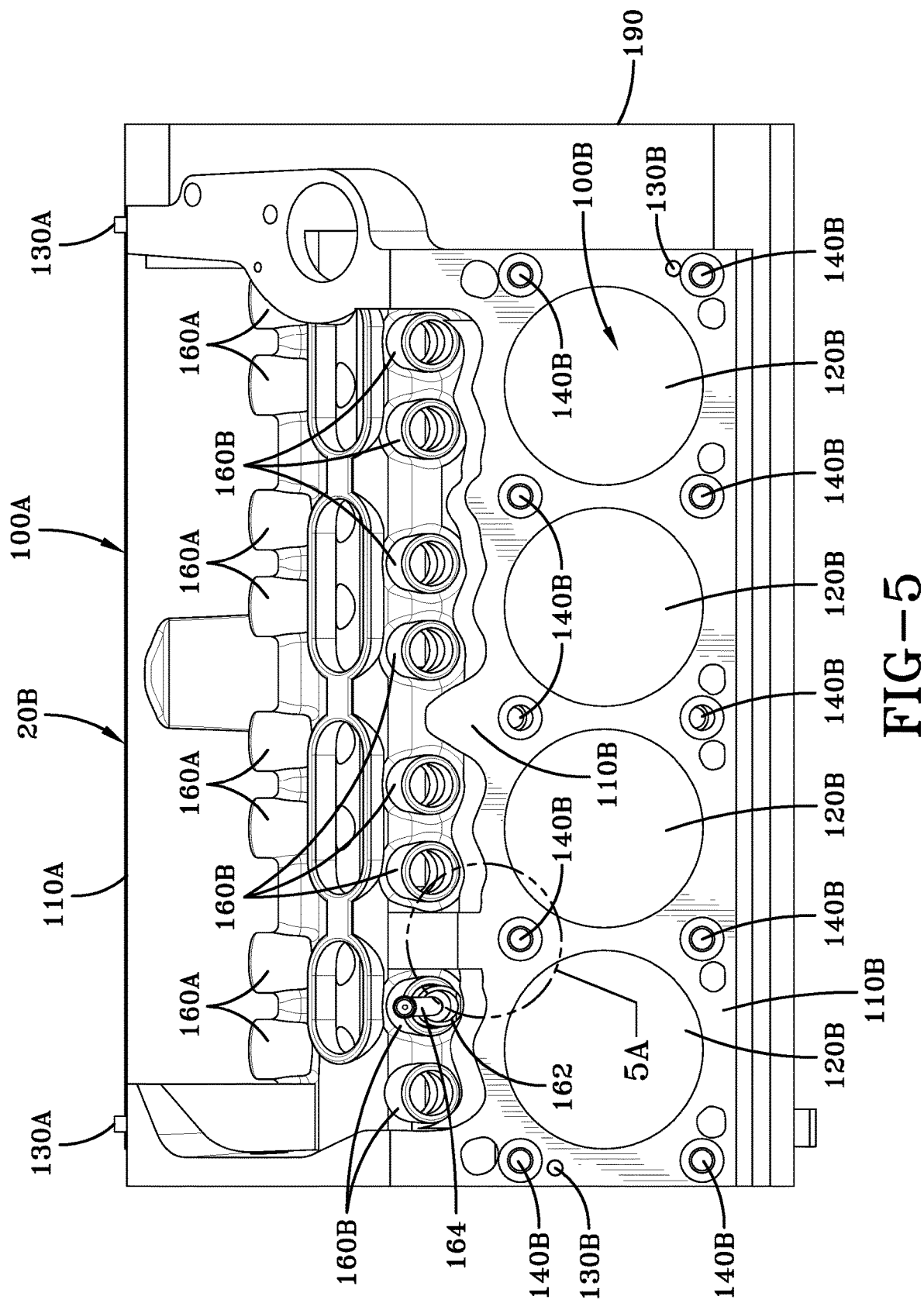
FIG. 5 is another perspective view of the "Magnum-style" engine block.
Figure 5A:
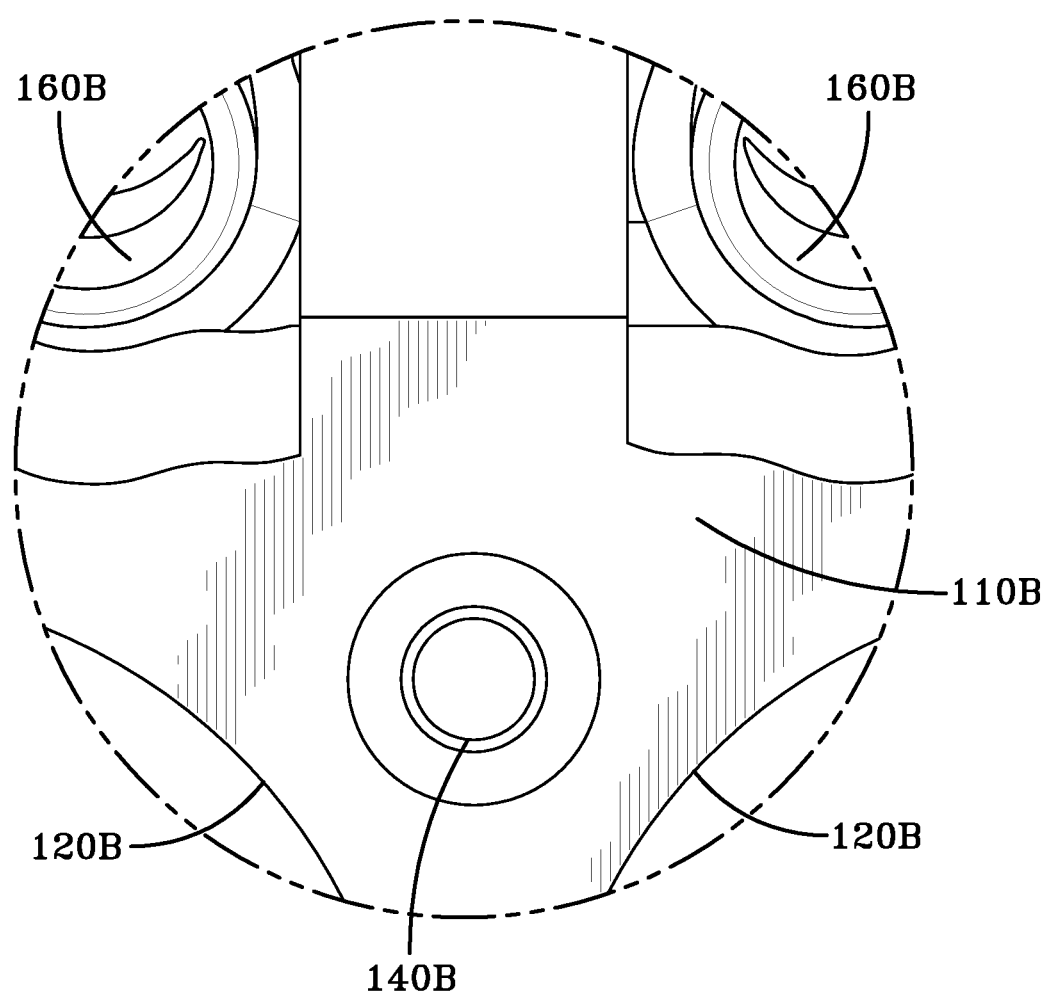
FIG. 5A is an inset view showing the absence of an oil outlet port provided by the "Magnum-style" engine block.

Various embodiments of a modular cylinder head 10 that is configured for use with combustion engine blocks 20A-B are set forth in the Figs. In particular, the cylinder head 10 is provided as a modular component that is compatible for use with multiple styles or configurations of engine blocks, including those provided under the brand MOPAR, which are commonly designated as an "LA-style" engine block 20A and a "Magnum-style" engine block 20B. These engine blocks 20A and 20B deliver lubricating oil from an oil source, such as the engine crankcase, to a valvetrain that is carried by the head 10 in different manners. For example, as shown in FIGS. 1-3A, the "LA-style" engine block 20A utilizes an oiling pathway for the valvetrain that is defined within the engine block body. Alternatively, as shown in FIGS. 4-5A, the "Magnum-style" engine block 20B utilizes an oiling pathway for the valvetrain that is defined through one or more lifters and pushrods. Due to the modular design of the cylinder head 10, it is capable of being utilized interchangeably with various engine block designs, including, but not limited to, the "LA-style" and "Magnum-style" engine blocks 20A and 20B discussed herein, and regardless of whether the engine blocks are manufactured by MOPAR. As such, the modular cylinder head 10 is capable of providing a path for oil to travel from the engine blocks 20A-B, such as from a crankcase or other reservoir provided thereby, to the valvetrain that is carried by the cylinder head 10 in a manner to be discussed.

I. "LA-Style" Ermine Block:

The "LA-style" engine block 20A is shown in FIGS. 1-3A and may be formed of any suitable material, such as steel, aluminum, and the like, as well as alloys thereof, for example. The engine bock 20A includes a pair of spaced cylinder banks 100A and 100B. The cylinder banks 100A and 100B respectively include planar cylinder bank faces or surfaces 110A and 110B through which a plurality of respective cylinder bores 120A and 120B are disposed. In particular, it should be appreciated that the cylinder banks 100A and 100B are mirror images of each other. Furthermore, the cylinder bores 120A-B of respective cylinder banks 100A-B may be positioned at any suitable angle relative to each other, and in some cases are arranged in a "V" configuration, as it is known in the art. Extending from the cylinder bank faces or surfaces 110A and 110B are a plurality of respective alignment protrusions 130A and 130B. In addition, a plurality of threaded head bolt mounting bores 140A and 140B are respectively disposed through the cylinder bank face surfaces 110A and 110B.

Positioned between each cylinder bank 100A and 100B is an intermediate section 150 of the engine block 10 through which a plurality of valve lifter bores 160A and 160B are disposed. In particular, the valve lifter bags 160A and 160B are at a position that is proximate to each of the respective cylinder banks 110A and 110B. That is, the pair of valve lifter bores 160A are disposed proximate to each of the cylinder bores 120A of cylinder bank 100A, while a pair of valve lifter bores 160B are disposed proximate to each of the cylinder bores 120B of the cylinder bank 100B. It should be appreciated that these valve lifter bores 160A and 160B are dimensioned to slideably receive a valve lifter or tappet 162 therein. The valve lifters 162, in turn, mechanically actuate corresponding pushrods 164 that ride thereupon. In addition, one or more oil return apertures (not shown) are provided within the intermediate section 150 of the engine block 20A to permit oil delivered to the cylinder head 10 in a manner to be discussed, to return to the engine block 20A, such as to its crankcase or other oil reservoir provided thereby.

Figure 1:
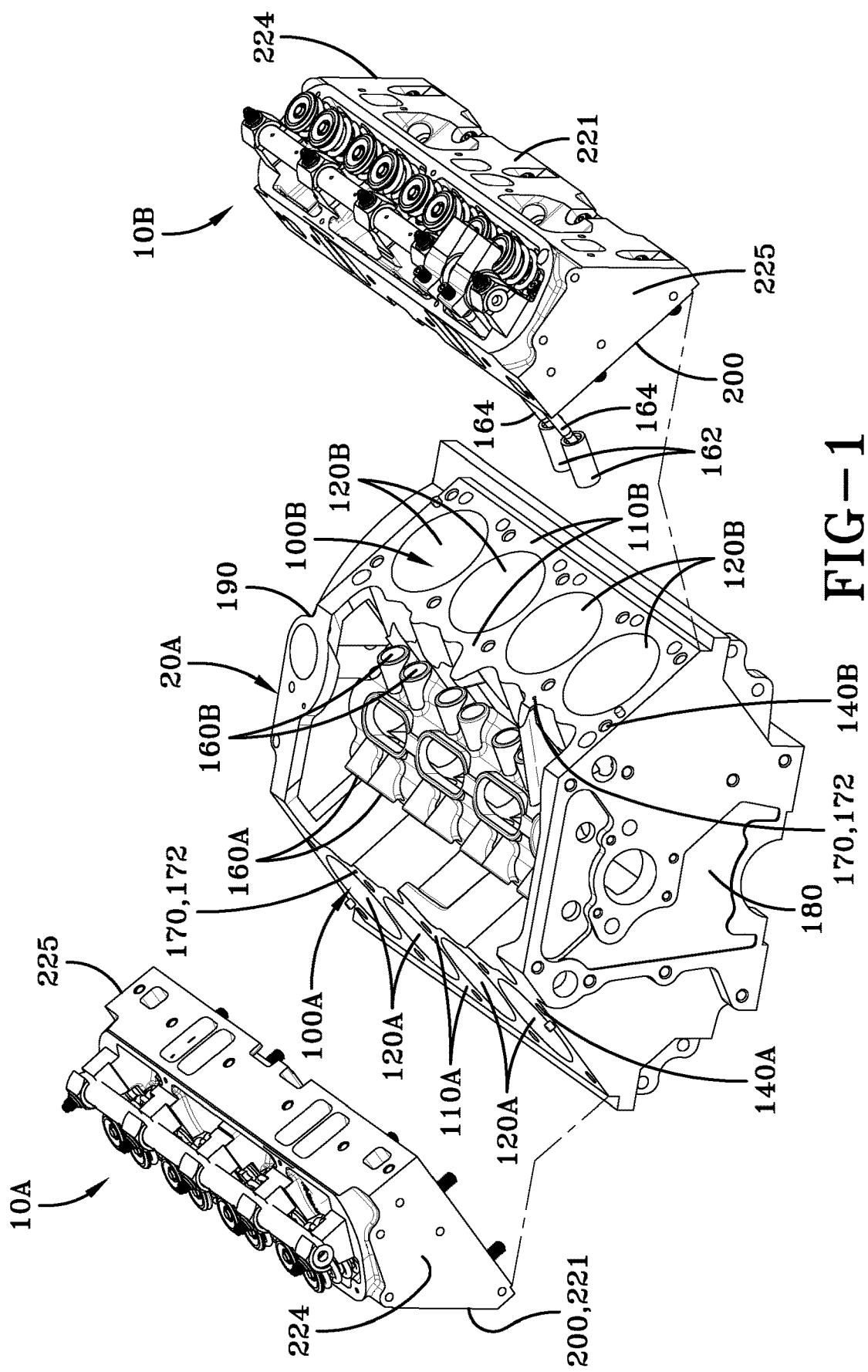
FIG. 1 is an exploded view of an "LA-style" engine block and a pair of modular cylinder heads in accordance with the concepts of the various embodiments disclosed herein.
Figure 2:
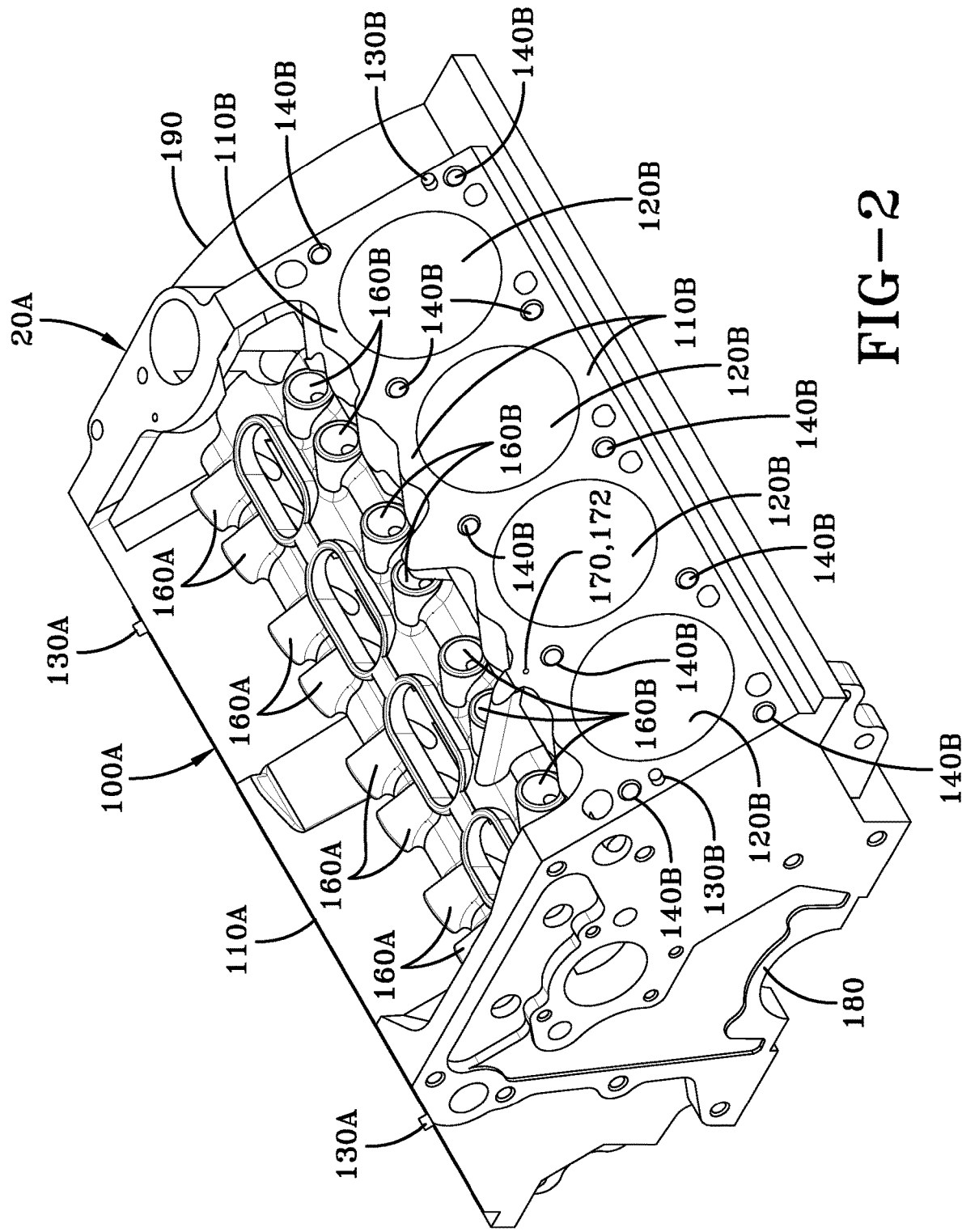
FIG. 2 is a perspective view of the "LA-style" engine block.
Figure 3:
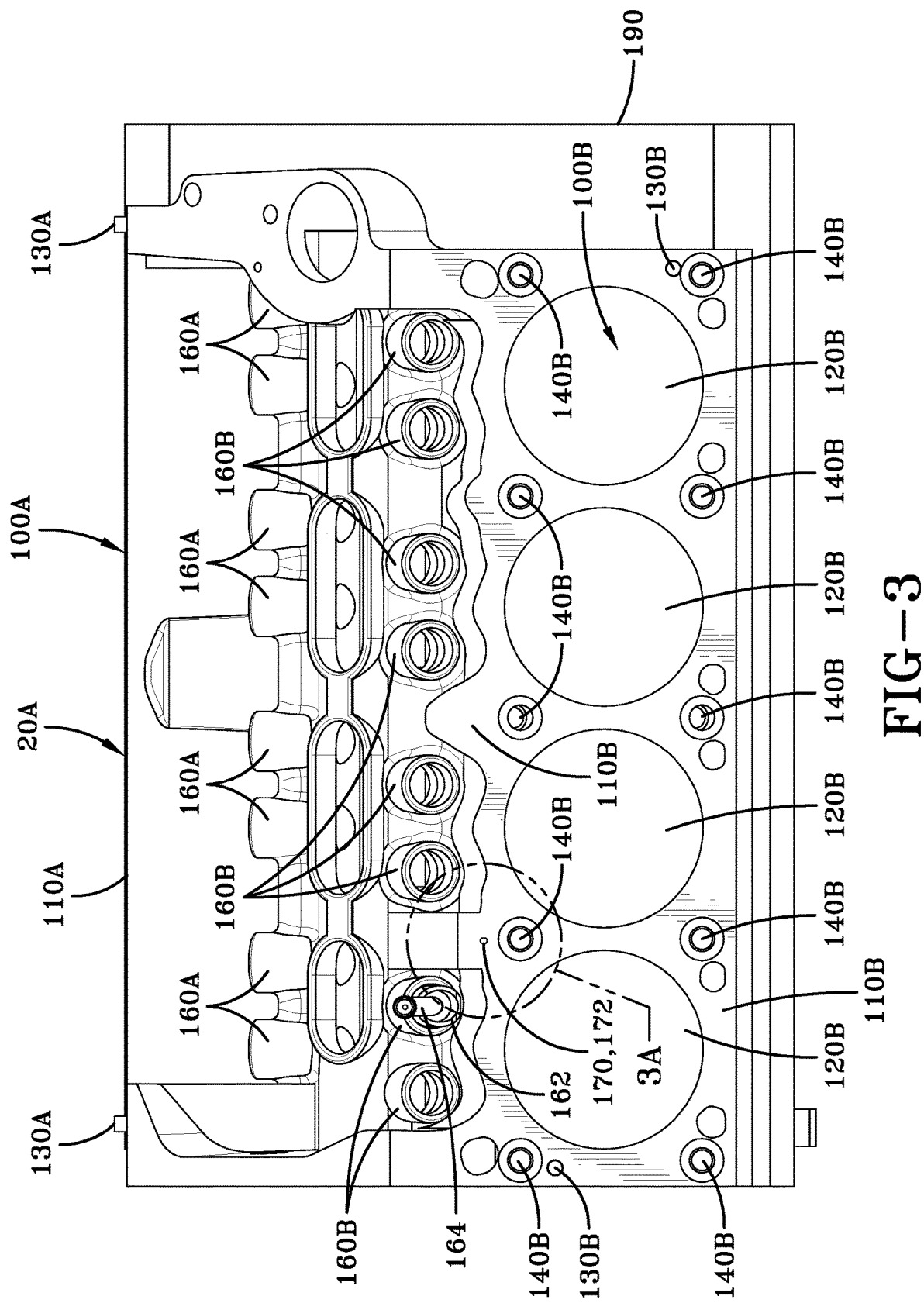
FIG. 3 is another perspective view of the "LA-style" engine block.
Figure 3A:
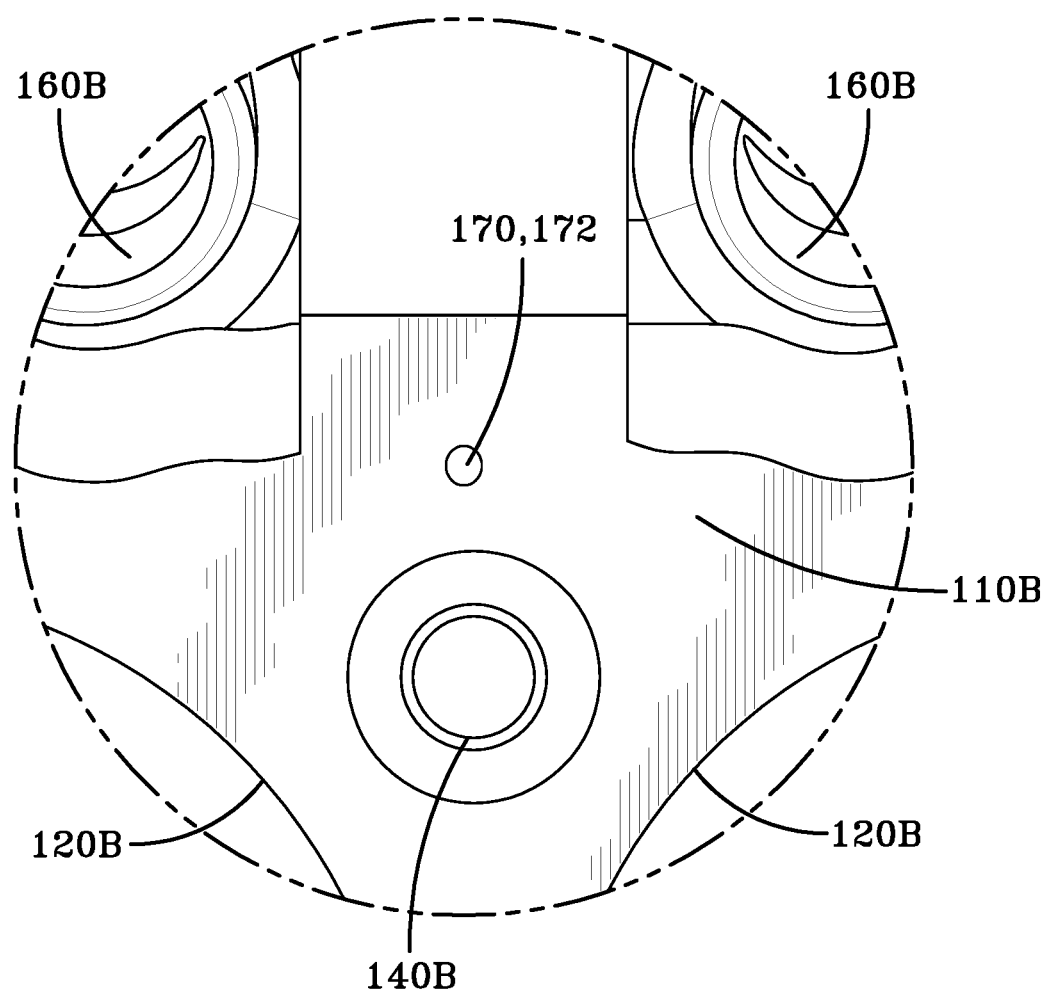
FIG. 3A is an inset view of an oil outlet port provided by the "LA-style" engine block.

An oil outlet port 170 having an opening 172, as shown in FIGS. 1, 3 and 3A, is disposed in cylinder bank face surfaces 110A and 100B of the engine block 20A. The oil outlet port 170 is configured to fluidly communicate with an oil reservoir. It should be appreciated that the oil reservoir may be provided by the engine block 20A directly or may be maintained separately from the engine block 20A. That is, the oil reservoir may comprise the engine block crankcase, or an external reservoir, such as a dry sump oil reservoir. The opening 172 of the oil outlet port 170 disposed in cylinder block 100B may be positioned proximate to a transmission end 180 of the engine block 20A. In addition, the opening 172 of the oil outlet port 170 disposed in the cylinder bank 100A may be positioned proximate to a pulley end 190 of the engine block 20A. Particularly, the transmission end 180 of the engine block 20 may be configured for attachment to a transmission assembly (not shown), while the pulley end 190 may be configured to have a plurality of rotating pulleys mounted proximate thereto (not shown) when the engine block 20A is fully assembled so as to be operative.

Figure 22:
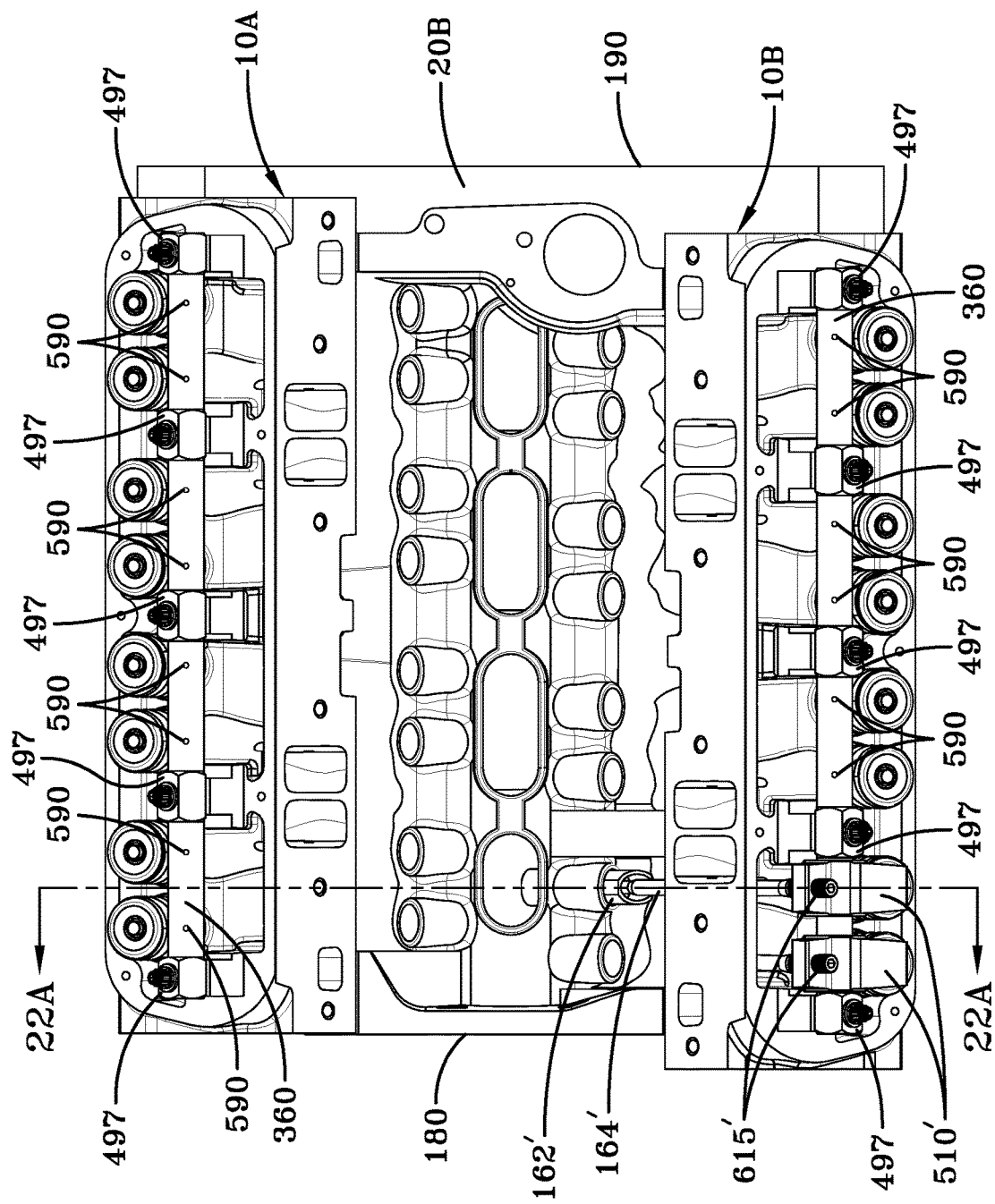
FIG. 22 is a top plan view of the modular cylinder head attached to the "Magnum-style" engine block in accordance with the concepts of the various embodiments disclosed herein.
Figure 22A:
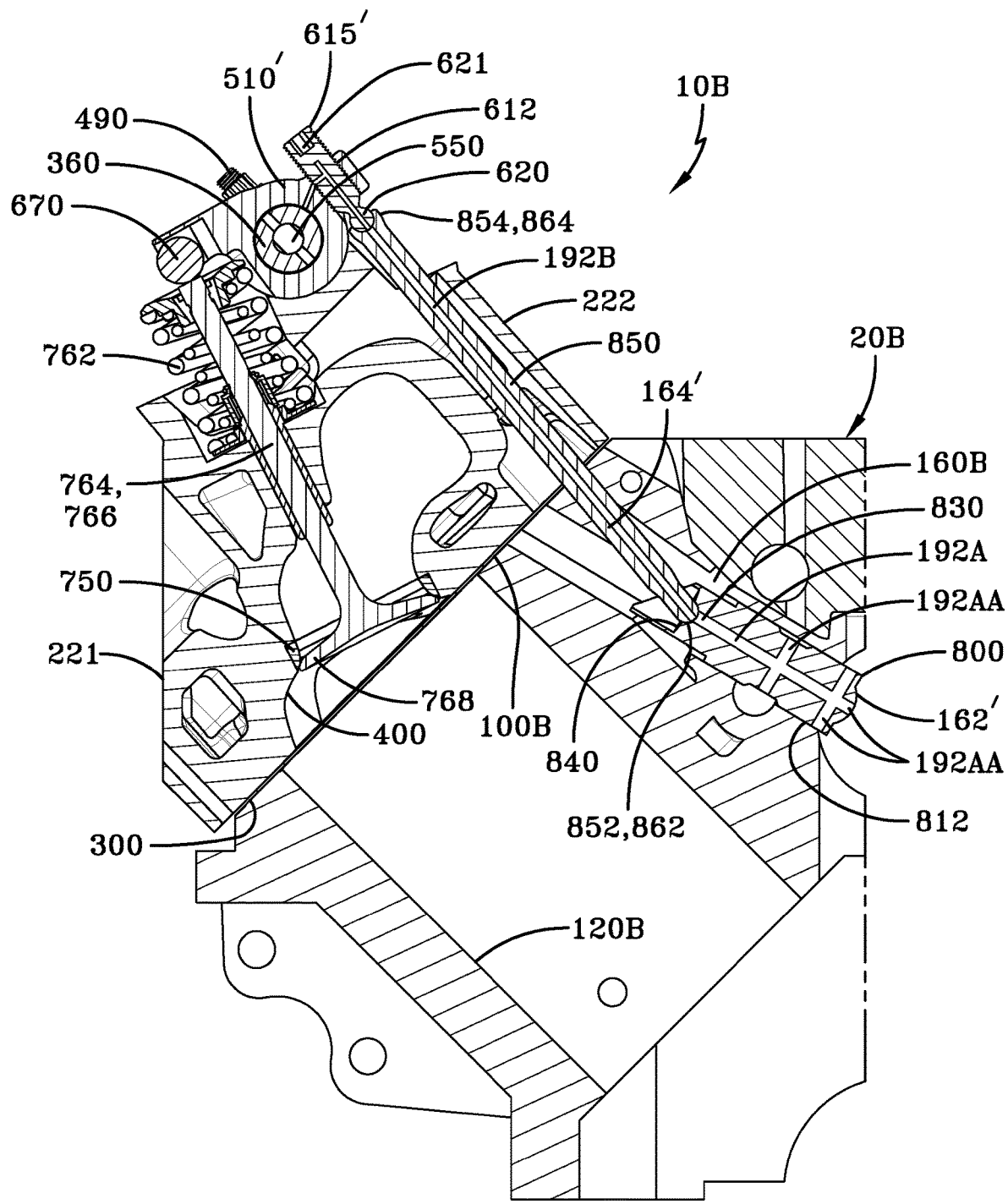
FIG. 22A is a cross-sectional view of the modular cylinder head attached to the "Magnum-style" engine block utilizing a pushrod and lifter having oil ports disposed therein in accordance with the concepts of the various embodiments disclosed herein.
Figure 23:
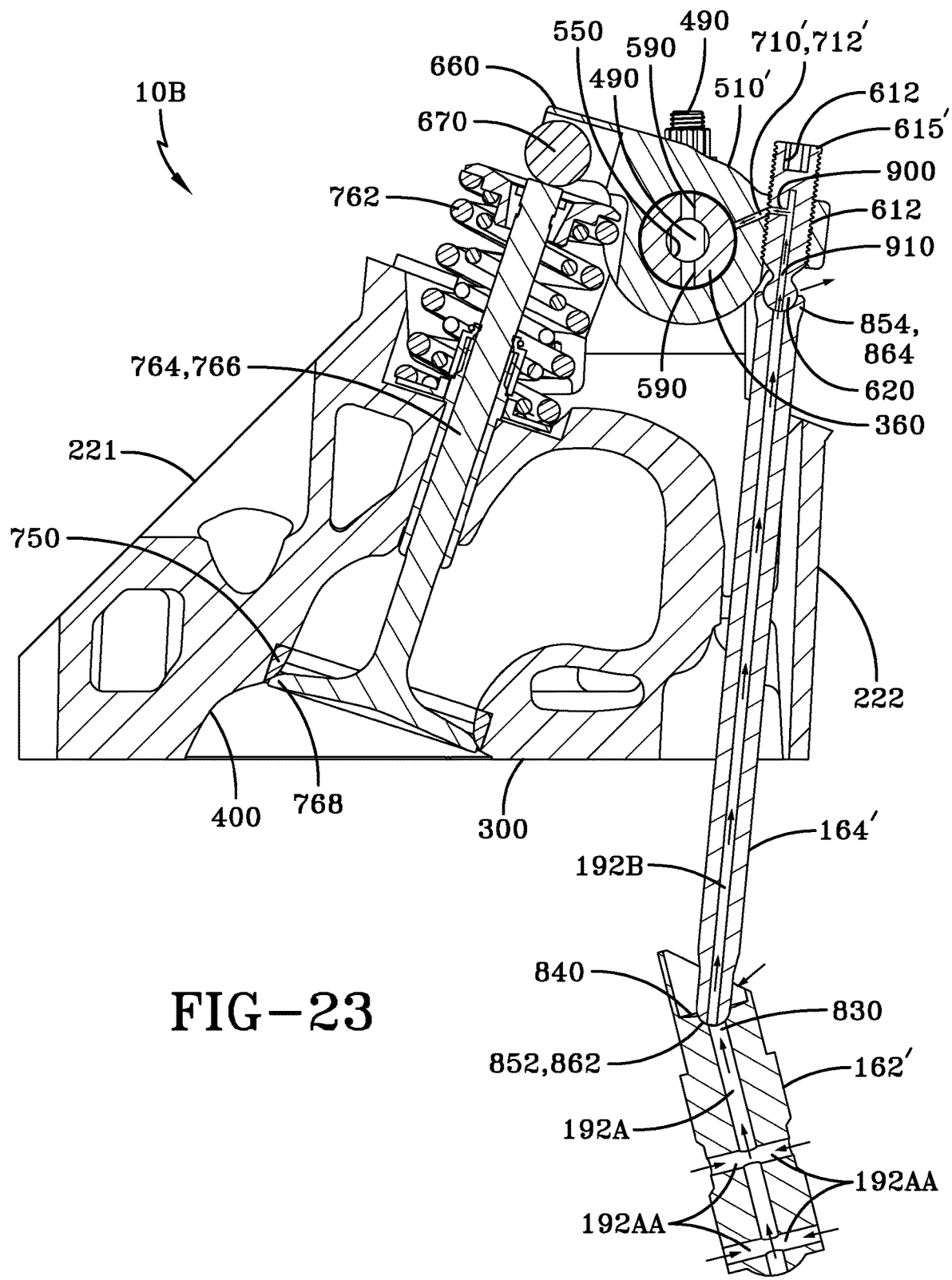
FIG. 23 is another cross-sectional view of the modular cylinder head attached to the "Magnum-style" engine block utilizing the pushrod and lifter having oil ports disposed therein in accordance with the concepts of the various embodiments disclosed herein.
Figure 24:
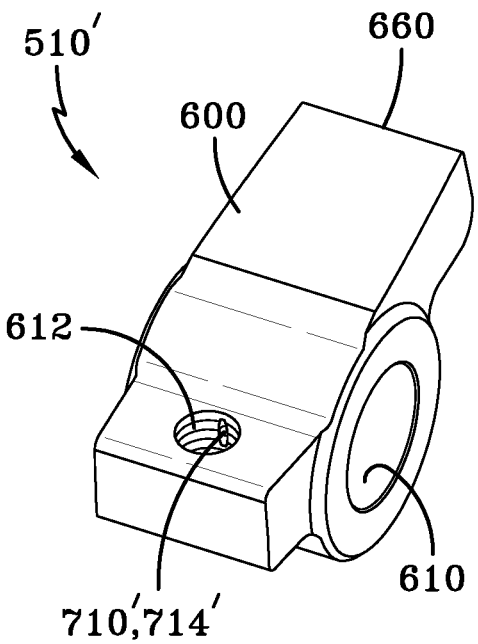
FIG. 24 is a perspective view of an alternative rocker arm utilized with the modular cylinder head when used with the "Magnum-style" engine block in accordance with the various embodiments disclosed herein.
Figure 24A:
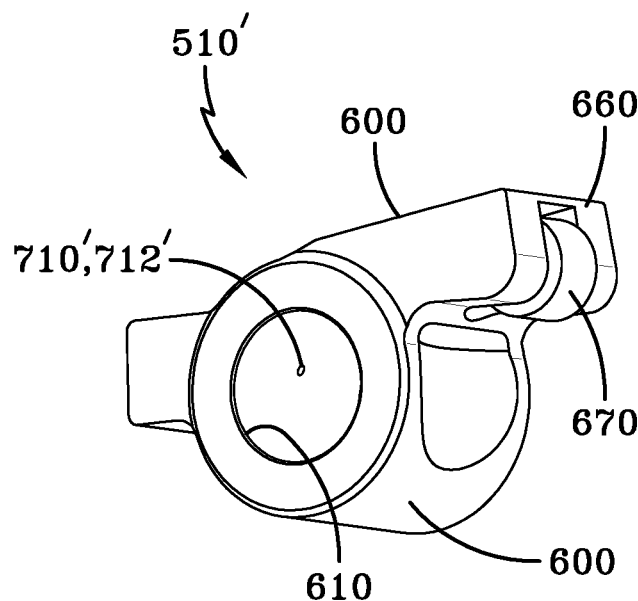
FIG. 24A is another perspective view of the alternative rocker arm utilized with the modular cylinder head when used with the "Magnum-style" engine block in accordance with the various embodiments disclosed herein.
Figure 25:
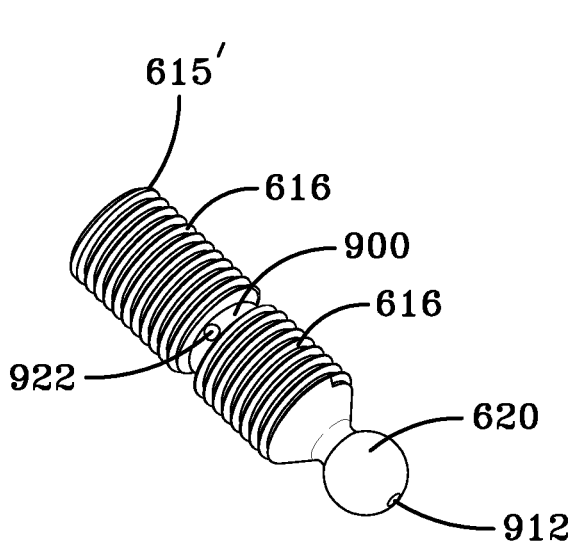
FIG. 25 is a perspective view of an alternative pushrod pivot member utilized with the alternative rocker arm shown in FIGS. 24-24A in accordance with the various embodiments disclosed herein.
Figure 25A:
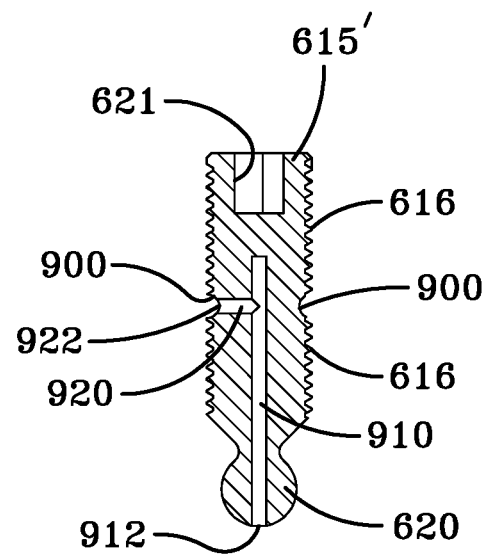
FIG. 25A is another perspective view of the alternative pushrod pivot member utilized with the alternative rocker arm shown in FIGS. 24-24A in accordance with the various embodiments disclosed herein.

II. "Magnum-Style" Engine Block:

The engine block 20B, shown in FIGS. 4-5A, is designated as a "Magnum-style" engine block and is structurally equivalent to the "LA-style" engine block 20A previously discussed, except that the oil outlet port 170 and the opening 172 that are utilized by the "LA-style" block 20A are not provided by the "Magnum-style" engine block 20B, as shown clearly in FIGS. 5 and 5A. Thus, instead of delivering oil through the engine block itself to the valvetrain, as in the case of the "LA-style" engine block 20A, the "Magnum-style" engine block 20B delivers oil from an oil reservoir, such as the engine block crankcase or other oil reservoir, through one or more lifters 162' and associated pushrods 164', via respective oil passages 192A/192AA and 192B disposed therein, shown in FIGS. 22A-23.

Thus, with the discussion of the various engine blocks 20A and 20B for which the cylinder head 10 may be used set forth, the structural and operational details of the head 10 and its particular utilization with each engine block 20A and 20B will now be set forth below.

III. Modular Cylinder Head:

A. Generally:

The modular cylinder head 10, shown in the various Figs. herein, is configured to be attached to each of the cylinder banks 100A and 100B of both the "LA-style" and "Magnum-style" blocks 20A-B in the manner discussed herein. Thus, for the sake of clarity, the heads 10 used in association with cylinder bank 100A and cylinder bank 100B are denoted as heads 10A and 10B respectively. Accordingly, heads 10A and 10B are structurally equivalent, with each head 10A and 10B being rotated by 180° relative to the other when attached to their respective cylinder banks 100A and 100B of the engine blocks 20A and 20B. Thus, for the convenience of the reader, the following discussion will be directed to that of head 10B and its attachment to cylinder bank 100B of the engine blocks 20A-B, with it being understood that such description is equally applicable to head 10A and its attachment to cylinder bank 100A of the engine blocks 20A-B.

B. Modular Cylinder Head and the "LA-Style" Engine Block:

1. Cylinder Head Body:

The cylinder head 10B includes a head body 200, as shown clearly in FIGS. 6-10. The head body 200 includes a valvetrain portion 210 and a combustion portion 220, which are positioned substantially opposite to each other. The cylinder head 10B also includes an exhaust side 221 and an intake side 222, which are also substantially opposite to each other. Furthermore, the cylinder head 10 is bounded at its longitudinal extent by an end 224 and an end 225. The head body 200 may be formed of any suitable material, such as composite, ceramic, steel, and aluminum, as well as alloys and combinations thereof. In addition, the head body 200 may be formed from any suitable manufacturing process, such as casting or forging.

Figure 7:
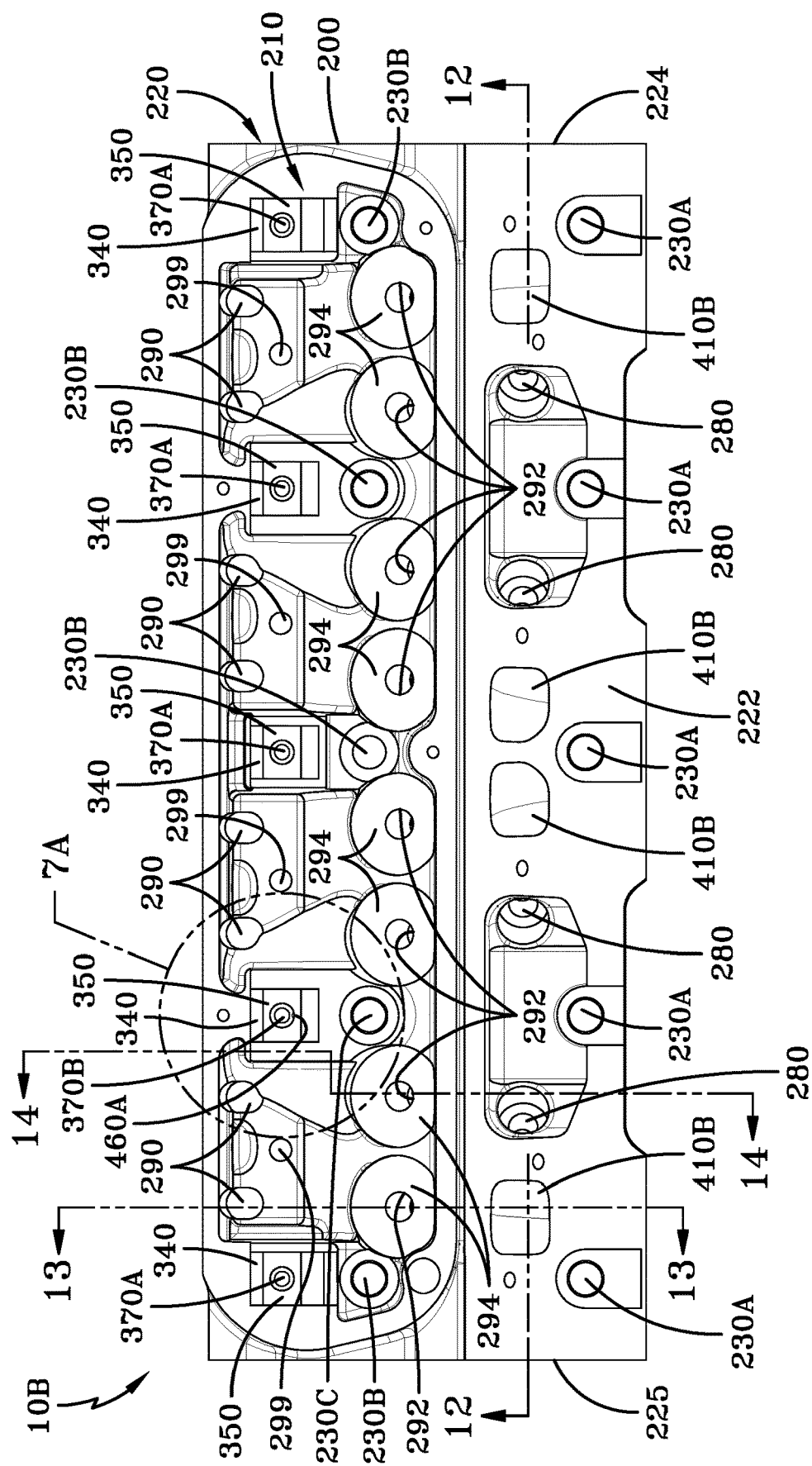
FIG. 7 is a top plan view of the modular cylinder head in accordance with the concepts of the various embodiments disclosed herein.
Figure 7A:
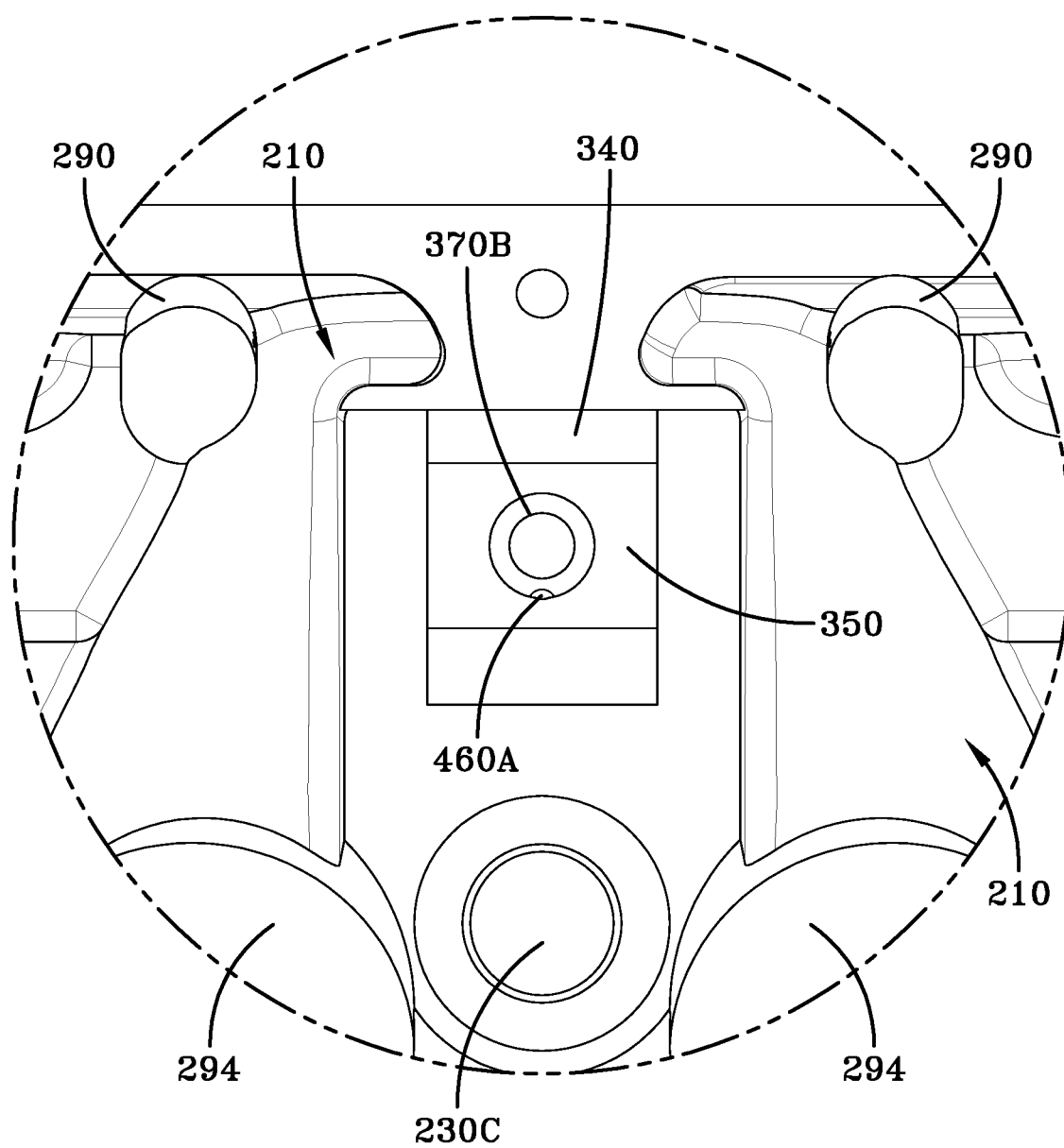
FIG. 7A is an inset view of a top portion of the modular cylinder head in accordance with the concepts of the various embodiments disclosed herein.

The valvetrain portion 210 of the head body 200, as shown in FIGS. 6-7A, includes a plurality of head bolt receiving bores or head mounting bores 230A, 230B, and 230C, which extend through the head body 200 into the combustion portion 220. The head bolt receiving bores 230A-C are configured to align with the pattern formed by the head bolt mounting bores 140A and 140B disposed in both the "LA-style" engine block 20A and the "Magnum-style" engine block 20B. It should be appreciated that the head bolt receiving bores 230B and 230C are equivalent, except that bore 230C is configured to be aligned with and fluidly communicate with the oil outlet port opening 172 of the "LA-style" engine block 20A, previously discussed.

Figure 10:
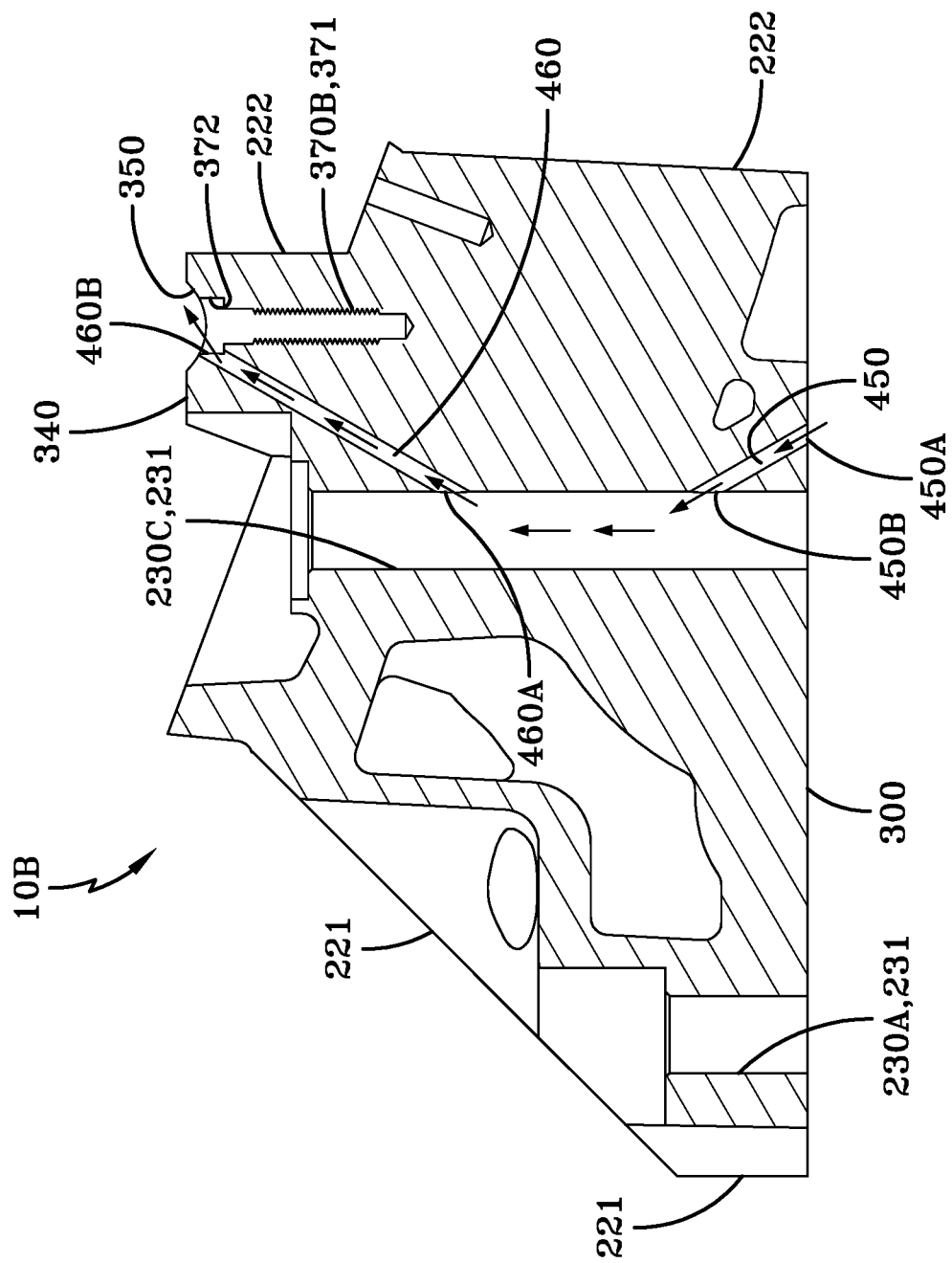
FIG. 10 is a cross-sectional view of the modular cylinder head in accordance with the concepts of the various embodiments disclosed herein.
Figure 14:
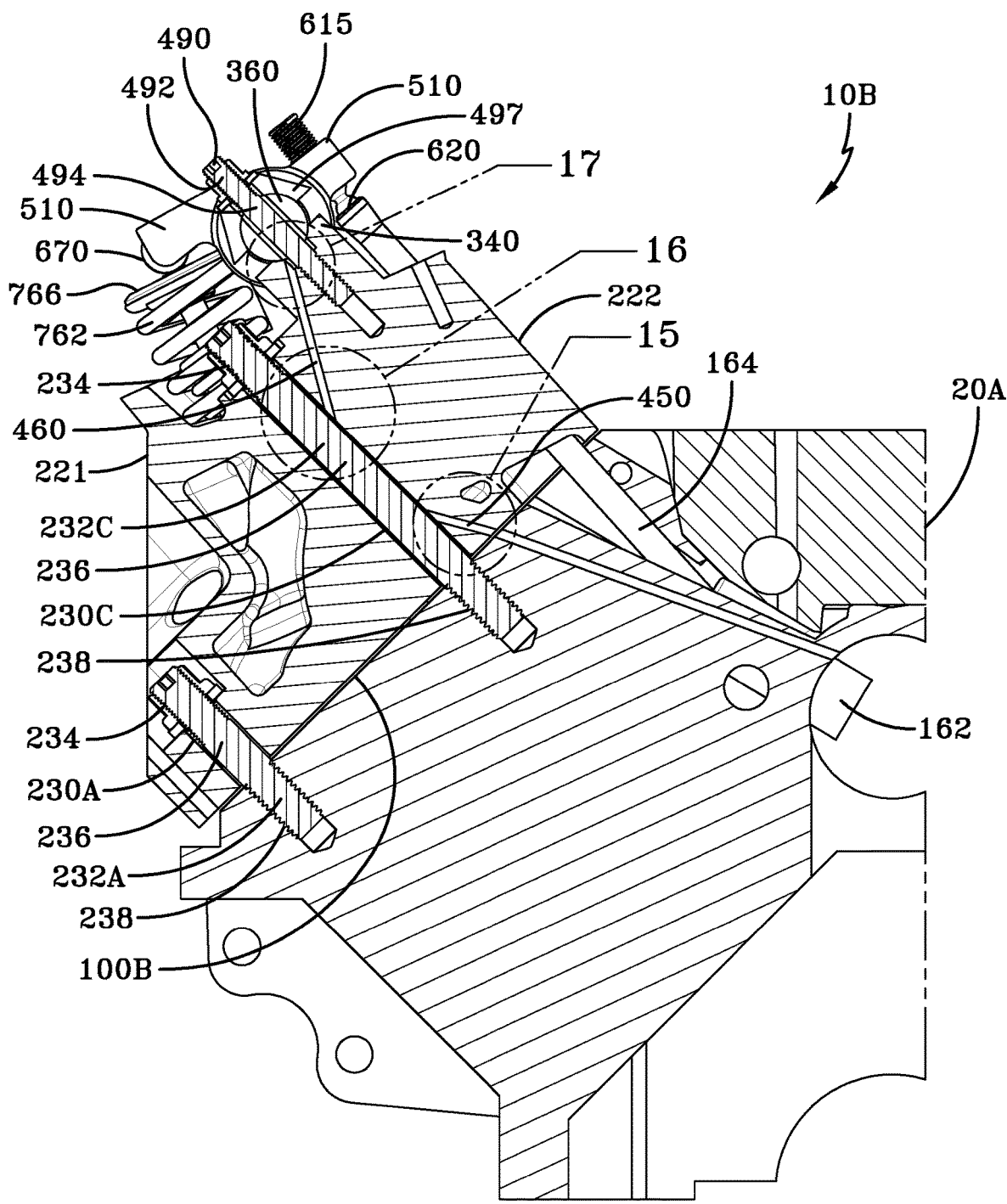
FIG. 14 is another cross-sectional view of the modular cylinder head attached to the "LA-style" engine block in accordance with the concepts of the various embodiments disclosed herein.

As shown in FIG. 10, the head bolt mounting bores 230A, 230B, and 230C have generally smooth cylindrical walls 231. The head bolt receiving bores 230A, 230B, and 230C are configured to receive respective head bolts 232A, 232B, and 232C therethrough, as shown in FIG. 14. In addition, the head bolts 232B are structurally equivalent to head bolt 232C. It should be appreciated that the head bolts 232A-C include a head 234 from which extends a body 236 having a smooth cylindrical outer surface 237, which is terminated by a threaded end 238. Thus, when the head bolts 232A-C are received in the bores 230A-C, the threaded ends 238 of the head bolts 232A-C are threadably received and retained in the mounting bores 140B of the engine blocks 20A-B, as shown in FIG. 14.

As shown in FIG. 7, a plurality of threaded spark plug bores 280 are disposed in the valvetrain portion 210 of the head body 200, which extend into the combustion portion 220. A plurality of pushrod bores 290 are also disposed in the valvetrain portion 210, which extend through the head body 200 into the combustion portion 220, allowing the pushrods 164 to freely move or slide therethrough. The valvetrain portion 210 also includes valve bores 292 that extend through the head body 200 into the combustion portion 220. In addition, each of the valve bores 292 are circumscribed by a valve spring seat surface 294. In some embodiments, this valve spring seat surface 294 may be annular. As such, the valve bores 292 are configured to slideably receive a valve stem of intake and exhaust valves to be discussed. Also disposed in the valvetrain portion 210 of the head 10B is one or more oil return bores 299, shown clearly in FIG. 7, that extend through the head body 200 and into the combustion portion 220.

Figure 18:
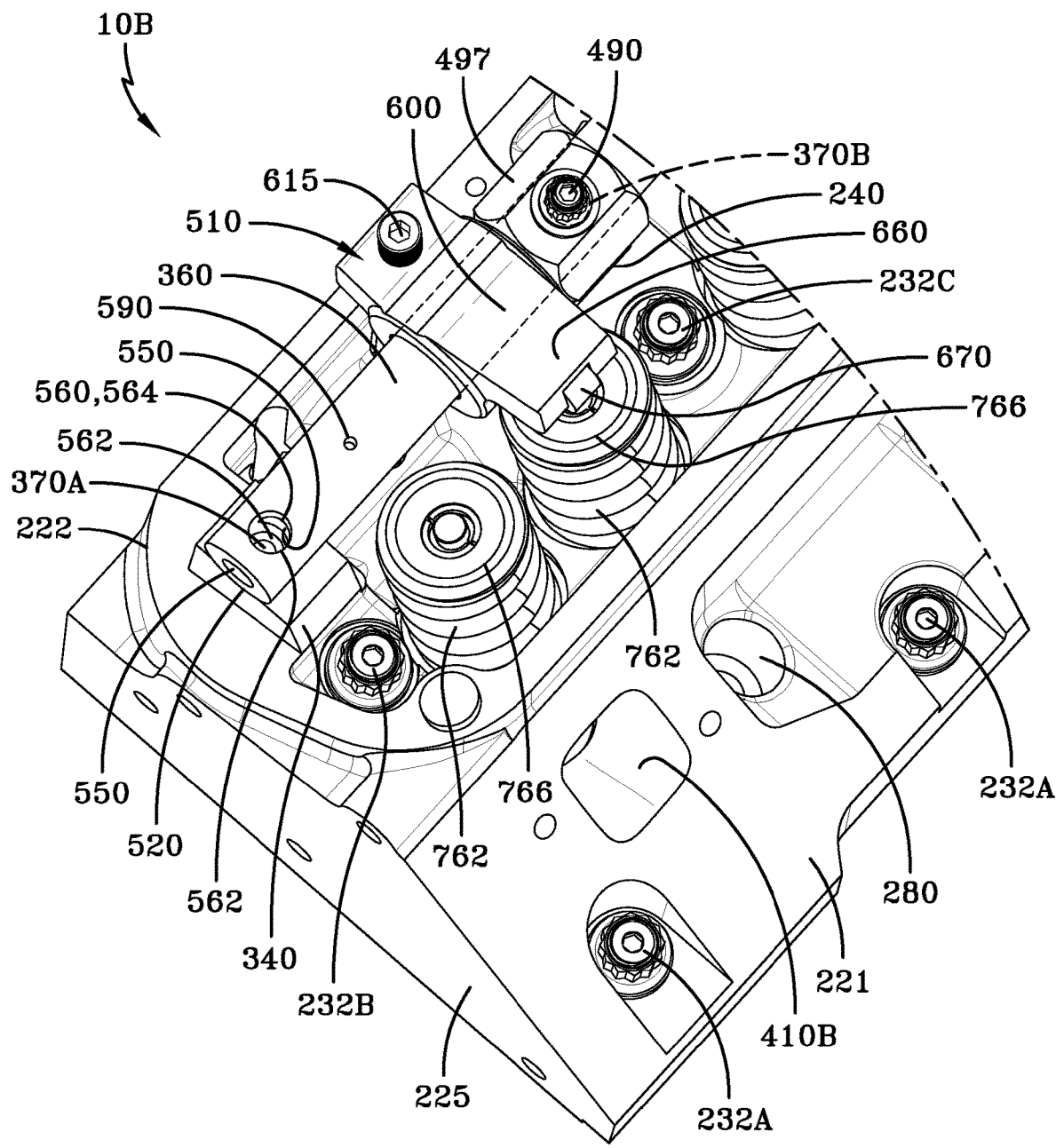
FIG. 18 is perspective view of the modular cylinder head in accordance with the concepts of the various embodiments disclosed herein.
Figure 18A:
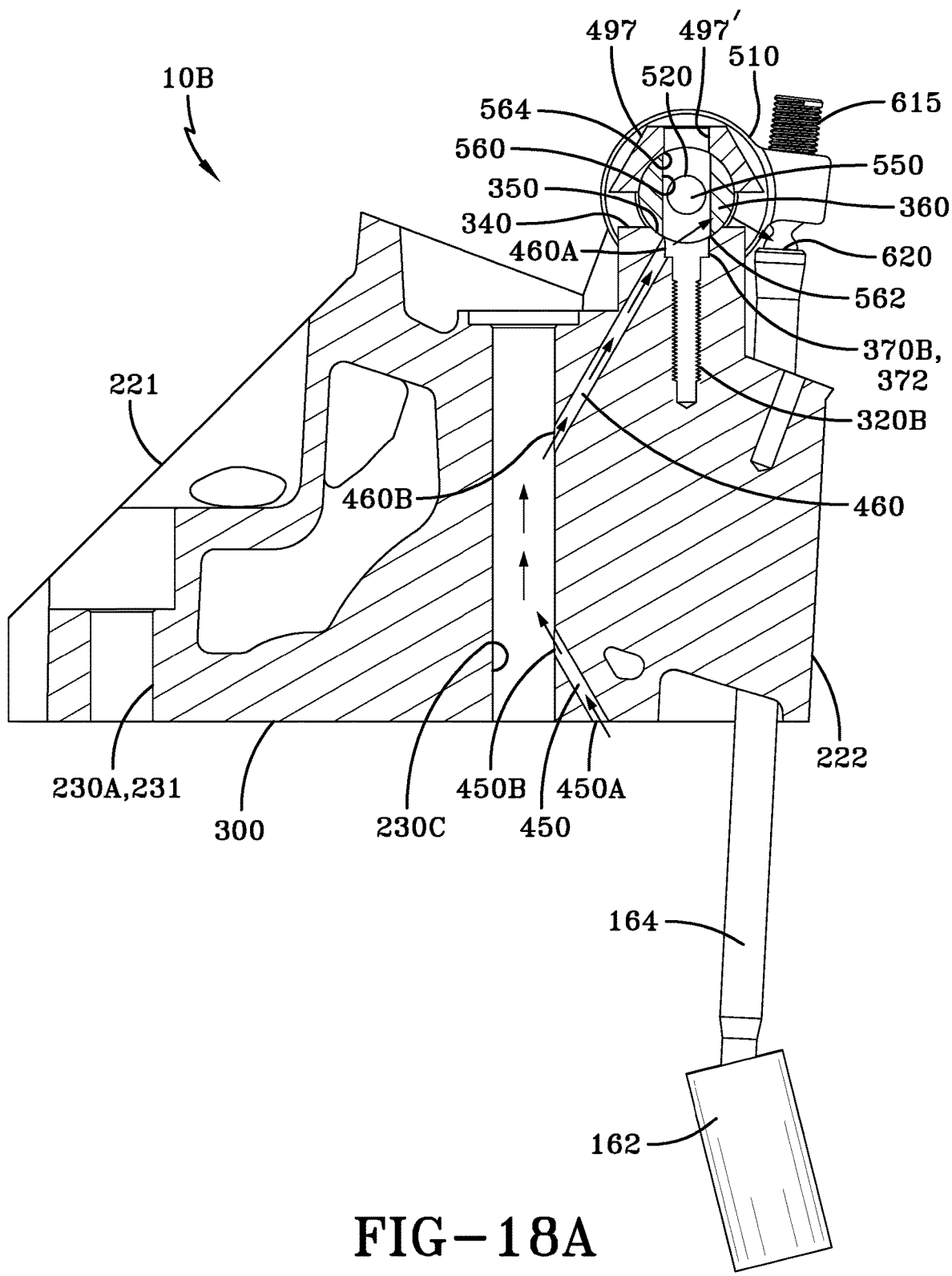
FIG. 18A is a cross-sectional view of the modular cylinder head in accordance with the concepts of the various embodiments disclosed herein.

The valvetrain portion 210 also includes a plurality of spaced rocker shaft mounting bosses 340, which have a concave or arcuate support surface 350. The concave support surface 350 of the mounting bosses 340 are in axial alignment with each other and are configured to support an elongated rocker shaft 360 thereon, as shown in FIGS. 18-18A. Disposed through the concave support surface 350 of each of the rocker shaft mounting bosses 340 is a threaded rocker shaft retention or mounting bore 370A, with the rocker shaft retention bore that is disposed proximate to the head bolt receiving bore 230C being denoted as rocker shaft retention bore 370B. It should be appreciated that the rocker shaft retention or mounting bores 370A-B include a threaded section 371 from which axially extends an annular port section 372.

The combustion portion 220 of the head body 200, shown in FIGS. 8 and 9, includes a planar combustion surface 300 that is configured to be placed adjacent to the cylinder bank face surface 100B of the engine blocks 20A-B. However, it should be appreciated that in some embodiments, a suitable gasket (not shown) may be disposed between the combustion surface 300 of the head 10 and the cylinder bank face surface 110A of the engine blocks 20A-B. Disposed in the combustion surface 300 are a plurality of combustion cavities 400, which include an exhaust port 410, an intake port 420, and the spark plug bore 280 that extends from the valvetrain portion 210. The exhaust ports 410 and intake ports 420 are configured such that the valve bores 292 open therein. As such, each of the combustion cavities 400 of the head 10B and corresponding cylinder bores 120B of the engine block 20A together form separate combustion chambers.

Figure 11:
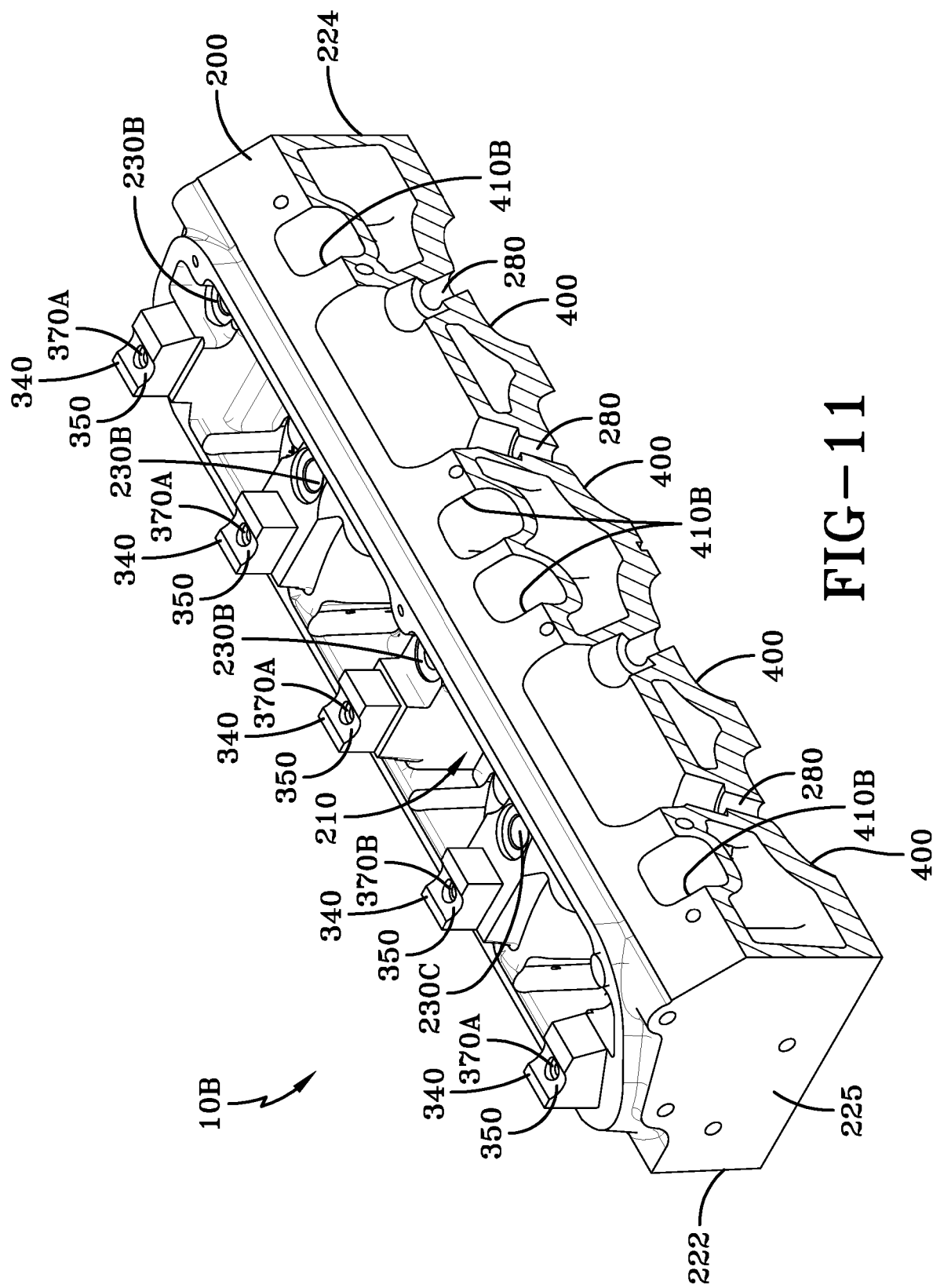
FIG. 11 is another cross-sectional view of the modular cylinder head in accordance with the concepts of the various embodiments disclosed herein.
Figure 12:
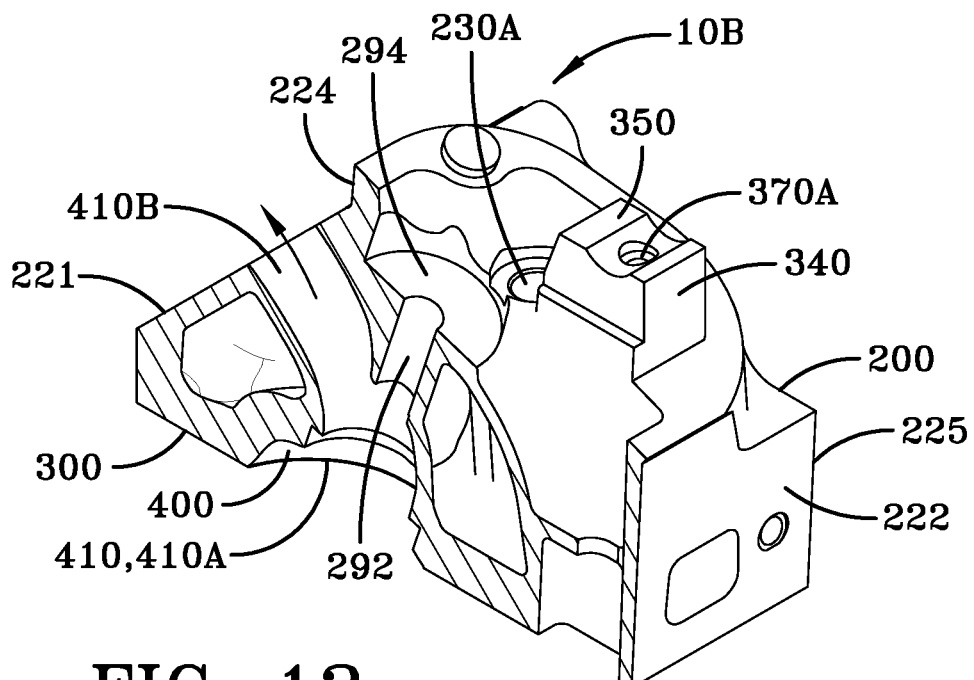
FIG. 12 is still another cross-sectional view of the modular cylinder head in accordance with the concepts of the various embodiments disclosed herein.
Figure 13:
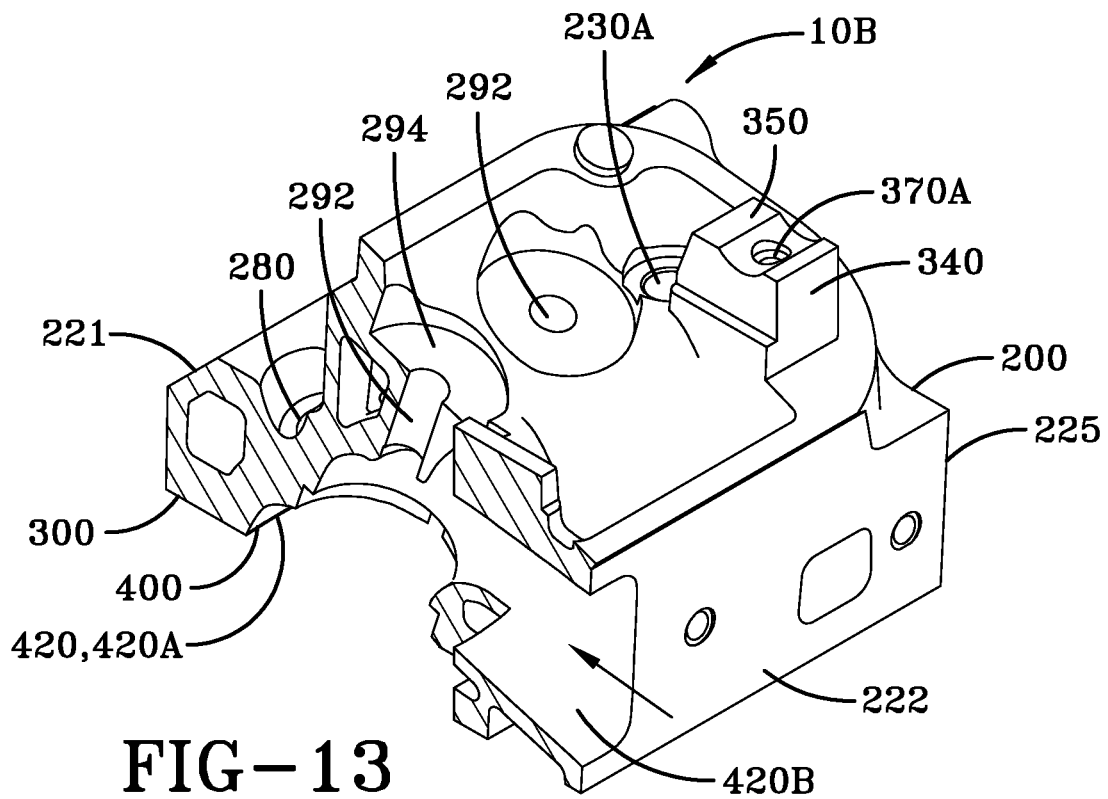
FIG. 13 is yet another cross-sectional view of the modular cylinder head in accordance with the concepts of the various embodiments disclosed herein.

As shown in FIGS. 11-13, each exhaust port 410 extends from an opening 410A disposed in the combustion cavity 400 to an opening 410B disposed in the exhaust side 221 of the head body 200. In addition, each intake port 420 extends from an opening 420A disposed in the combustion cavity 400 to an opening 420B disposed in the intake side 222 of the body 200. The combustion surface 300 also includes the plurality of head bolt receiving bores 230A-C. In addition, the combustion surface 300 includes a recessed region 430 that includes the pushrod bores 290 and the oil return bores 299. Furthermore, an oil receiving port 450 has an opening 452 disposed in the combustion surface 300 of the head body 200 at a point that is proximate to the transmission end 180 of the engine block 20A when mounted thereto.

2. Oil Receiving Port and Oil Delivery Port:

Continuing to FIGS. 10 and 14-17, the head body 200 includes an oil receiving port 450 and an oil delivery port 460 that both fluidly communicate with the head bolt receiving bore 230C. In particular, the oil receiving port 450 has an opening (receiving opening) 450A disposed in the combustion surface 300 and an opening 450B disposed in the wall 231 of the head bolt receiving bore 230C. In addition, the oil delivery port 460 has an opening 460A disposed in the rocker shaft retention bore 370B and an opening (delivery opening) 460B disposed in the wall 231 of the head bolt receiving bore 230C. Thus, the openings 450B and 460B place the respective oil receiving port 450 and oil delivery port 460 into fluid communication with the head bolt receiving bore 230C. Accordingly, oil entering the opening 450A is permitted to flow through the oil receiving port 450, into the head bolt receiving bore 230C, in the manner to be discussed, and into the oil delivery port 460, where it exits the head body 200 via the opening 460B.

Figure 15:
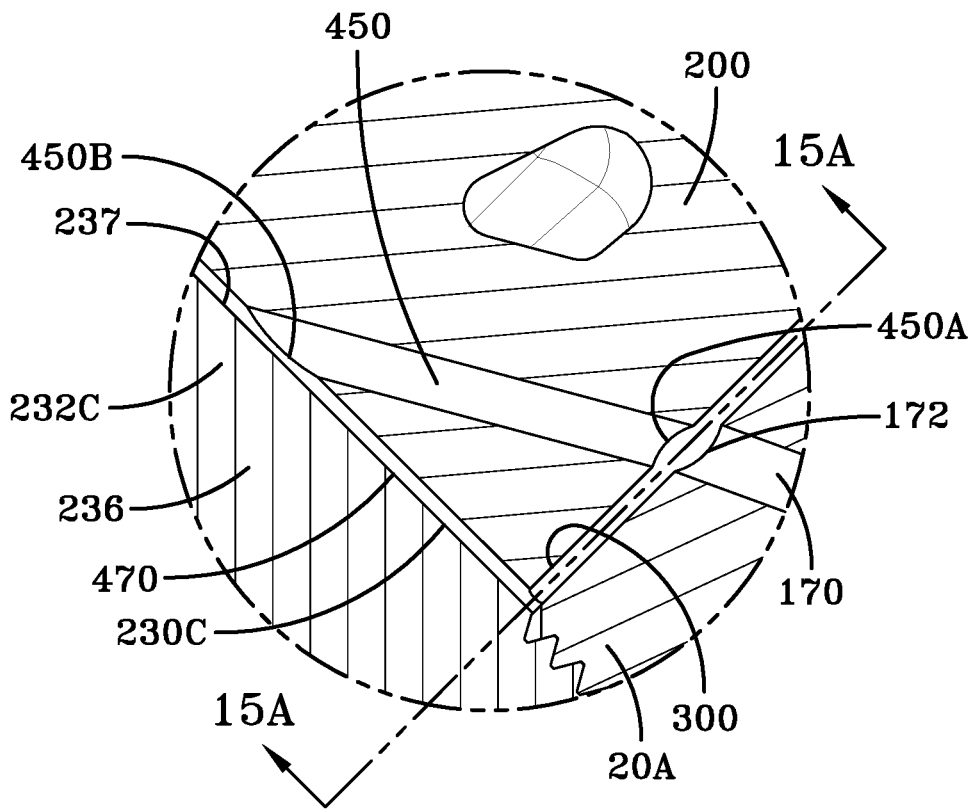
FIG. 15 is an inset view of the modular cylinder head having an oil receiving port and the "LA-style" engine block shown in FIG. 14 in accordance with the concepts of the various embodiments disclosed herein.
Figure 15A:
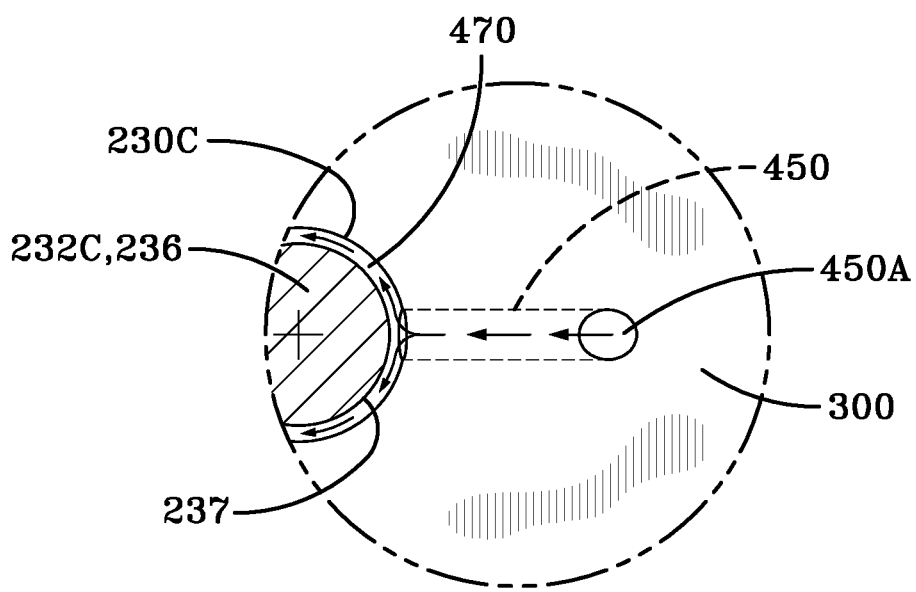
FIG. 15A is a view of the oil receiving port and a passage formed between the head bolt and the head bolt mounting bore in accordance with the concepts of the various embodiments disclosed herein.
Figure 16:
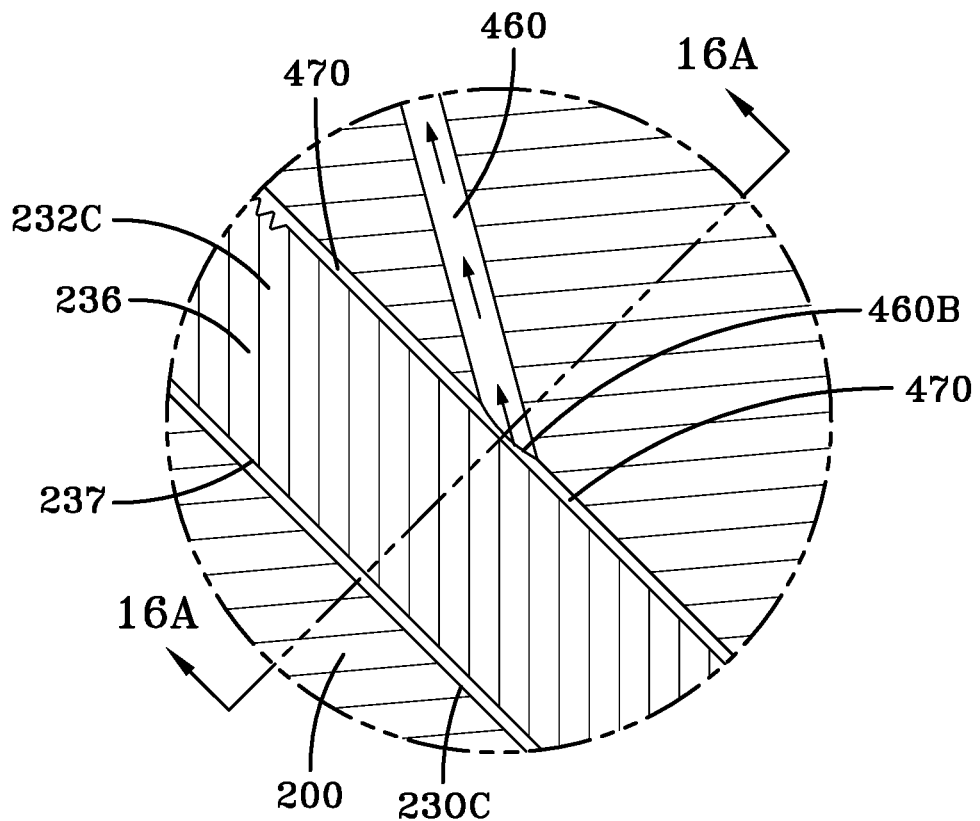
FIG. 16 is an inset view of the modular cylinder head having an oil delivery port in accordance with the concepts of the various embodiments disclosed herein.
Figure 16A:
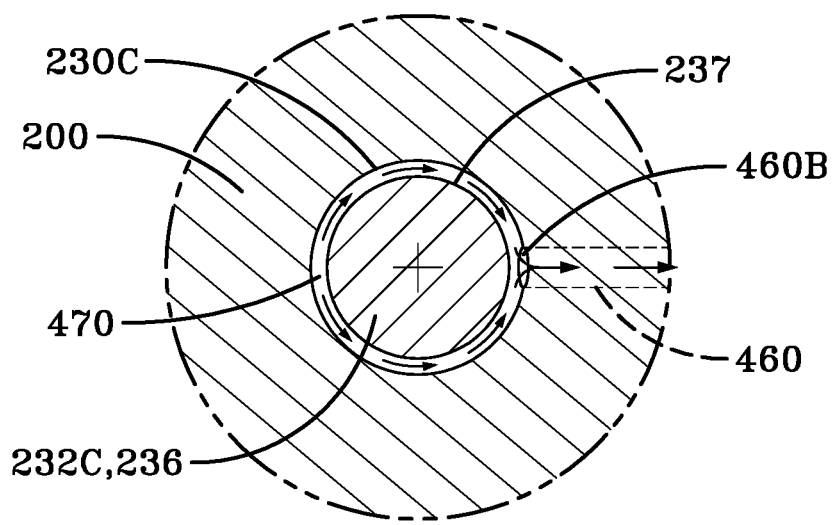
FIG. 16A is a view of the oil delivery port and the passage formed between the head bolt and the head bolt mounting bore in accordance with the concepts of the various embodiments disclosed herein.

3. Cylinder Head Oil Passage:

When the head bolt 232C is received through the head bolt receiving bore 230C of the head 10B and is fastened to the block 20A, as shown in FIGS. 14-16, the smooth body 236 of head bolt 232C is positioned within the head bolt receiving bore 230C so that the body 236 is adjacent to the openings 450B and 460B of the oil receiving port 450 and the oil delivery port 460 respectively. Furthermore, the diameter of the body 236 of the head bolt 232C is configured such that it is smaller than the diameter of the head bolt mounting bore 230C, as shown in FIGS. 15-15A and 16-16A, so as to form a gap or passage 470 therebetween, which fluidly couples the oil receiving port 450 and the oil delivery port 460 together via respective openings 450B and 460B.

Figure 17:
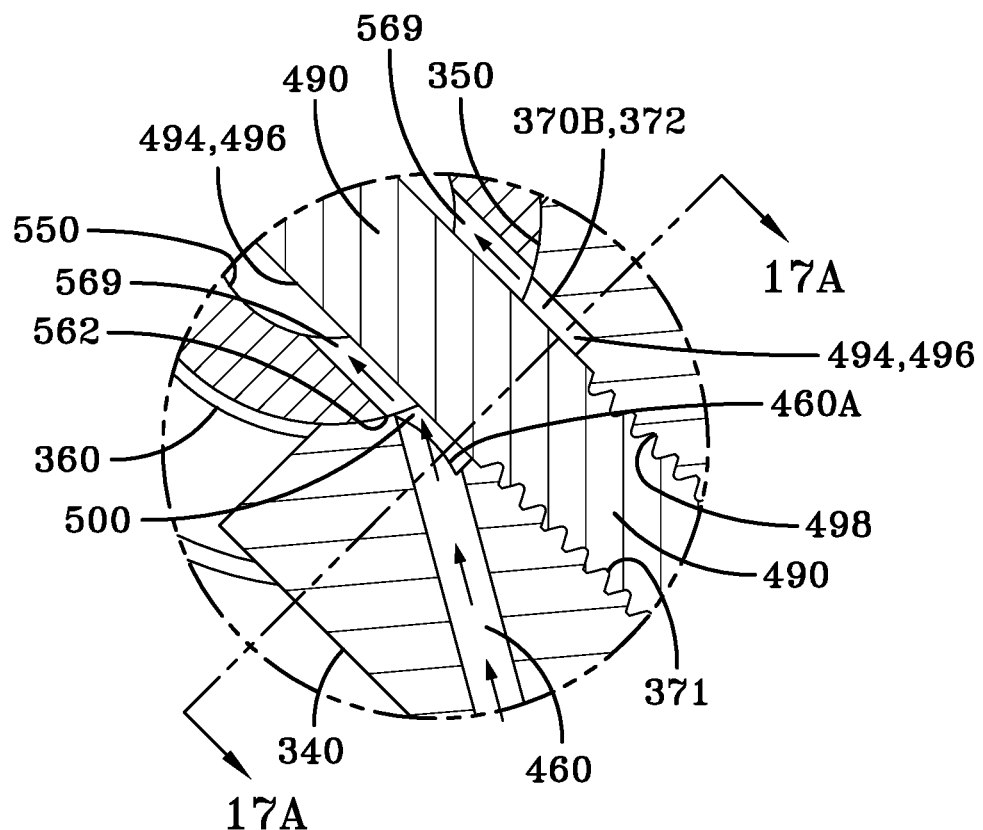
FIG. 17 is an is an inset view of the modular cylinder head showing the oil delivery port in accordance with the concepts of the various embodiments disclosed herein.
Figure 17A:
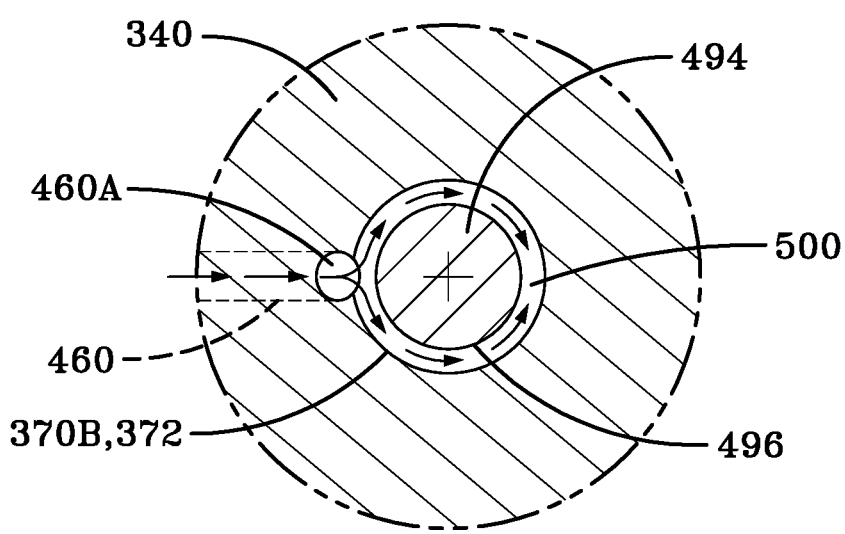
FIG. 17A is a view of the oil delivery port and a passage formed between a rocker shaft retention bolt and a rocker shaft retention bore in accordance with the concepts of the various embodiments disclosed herein.

4. Rocker Shaft Outlet Oil Passage:

As shown clearly in FIGS. 17-17A, the rocker shaft retention bore 370B includes the terminal threaded bore portion 371, from which extends the cylindrical port bore 372 that is positioned adjacent to the concave surface 350. The port bore 372 is configured to have a diameter that is larger than the diameter of the threaded bore portion 371. The rocker shaft retention bores 370A and 370B are configured to receive rocker shaft retention bolts 490 therein. The rocker shaft retention bores 370A-B are configured to threadably receive the rocker shaft retention bolts 490 therein. In particular, as shown in FIG. 14, the rocker shaft retention bolt 490 includes a head 492 from which extends a body 494 having a smooth cylindrical outer surface 496, which is terminated by a threaded end 498.

Thus, when the rocker shaft retention bolts 490 are received in the rocker shaft retention bores 370A-B, the threaded end 498 of the rocker shaft retention bolts 490 are received and retained to the threaded bore portion 371 of the rocker shaft retention bores 370A-B. With regard to the rocker shaft retention bore 370B, the rocker shaft retention bolt 490 is fastened, such that its smooth body 496 is positioned within the rocker shaft retention bore 370B so that it is adjacent to the opening 460A of the oil delivery port 460. Furthermore, the body portion 494 of the rocker shaft retention bolt 490 is configured such that it has a diameter that is smaller than the diameter of the annular port bore 372, as shown in FIGS. 17 and 17A, so as to form a gap or passage (i.e. rocker outlet passage) 500 therebetween.

The opening 460A that is disposed in the wall of the of the annular port section 372 of the rocker shaft retention bore 370B allows oil to flow from the oil delivery port 460 and enter the annular port bore 372 for delivery into the rocker shaft 360 shown in FIGS. 18 and 18A. Thus, the head body 200 permits oil that is delivered into the oil receiving port 450 from an oil outlet port 170 that is provided by the engine block 20A to flow into the gap or passage 470 formed between the head bolt 232C and the head bolt bore 230C. Next, the oil within the passage 470 is permitted to enter into the oil delivery port 460, whereupon it enters into the gap or passage 500 formed between the port bore 372 of the rocker shaft retention bore 370B and the rocker shaft retention bolt 490. The oil within the passage 500 is then delivered into the rocker shaft 360 that pivotably carries various rocker arms 510 provided by a valvetrain 699, in a manner to be discussed below.

5. Rocker Shaft Inlet Oil Passage:

The rocker shaft 360 is configured to be carried upon the arcuate support surfaces 350 of the mounting bosses 340, as shown in FIGS. 18-18A. In addition, the rocker shaft 360 includes an elongated cylindrical rod that is terminated by openings 520 and 530 at each end. An elongated longitudinal cavity or oil passage 550 is disposed through the length of the rocker shaft 360 and extends to fluidly connect one or more of the openings 520 and 530 together. A plurality of rocker shaft mounting bore pairs 560 are disposed through the walls of the cylindrical rocker shaft 360. It should be appreciated that the bore pairs 560 open into the longitudinal cavity 550 of the rocker shaft 360. That is, each set of bore pairs 560 are coaxially positioned so as to extend through the diameter of the rocker shaft 360. Each of the bore pairs 560 defines respective opposed base 562 and cap openings 564. Each of the bore pairs 560 (or openings 562 and 564) are configured to receive mounting bolts 490 therethrough to mount the rocker shaft 360 to the mounting bosses 340 provided by the head 10B. In some embodiments, the rocker shaft 360 may also be retained to the mounting bosses 340 via retention caps 497 in conjunction with the bolts 490. The retention cap 497 may be arcuate in shape to accommodate the curvature of the rocker shaft 360. In addition, the retention cap 497 also includes an aperture 497' to receive the bolts 490 therethrough.

Continuing, rocker shaft 360 may be configured so that the diameter of each of the bore pairs 560 (or openings 562 and 564) is greater than the diameter of the body 494 of the rocker shaft retention bolt 490, so as to form a gap or passage (rocker inlet passage) 569 therebetween. The diameter of the openings 562 and 564 is also configured so that the size of the base opening 562 is concentric with the dimension of the port 372, such that the diameter of the base opening 562 is equal to or greater than the diameter of the port 372. By providing this dimensional relationship between the port 372 and the base opening 562 of the retention shaft 360, oil that is supplied through the oil delivery port 460 to the gap 500 formed between the body of the rocker shaft retention bolt 490 and the port 372 is permitted to flow into the passage 569 formed between the body of the rocker shaft retention bolt 490 and the openings 562 and 564 of the rocker shaft bores 560. The oil within this gap 569 is permitted to enter the elongated cavity 550 of the rocker shaft 360 where it is expelled out of one or more spaced rocker shaft outlet apertures 590 that are disposed in the rocker shaft 360 and in fluid communication with the cavity 550.

Figure 19A:
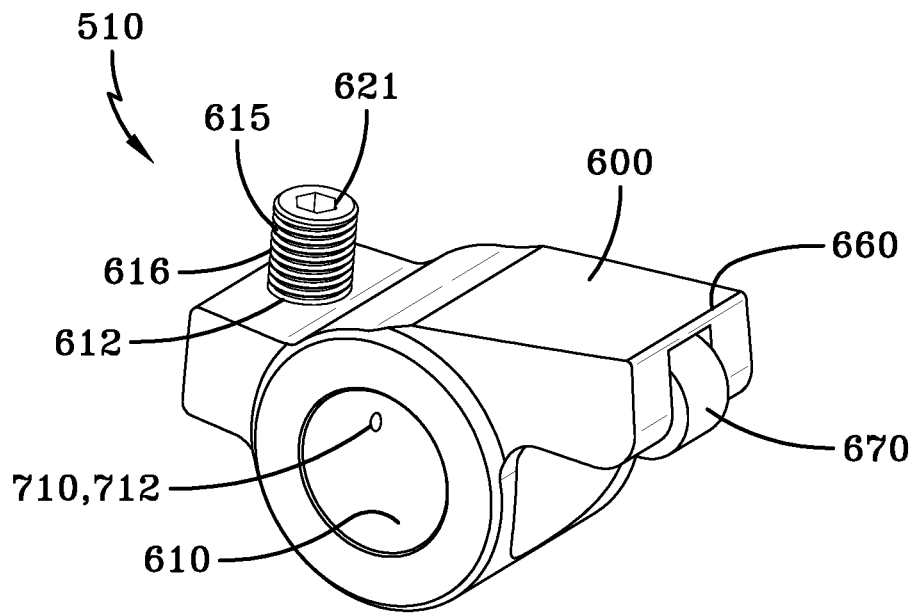
FIG. 19A is perspective view of a rocker arm utilized by the modular cylinder head in accordance with the concepts of the various embodiments disclosed herein.
Figure 19B:
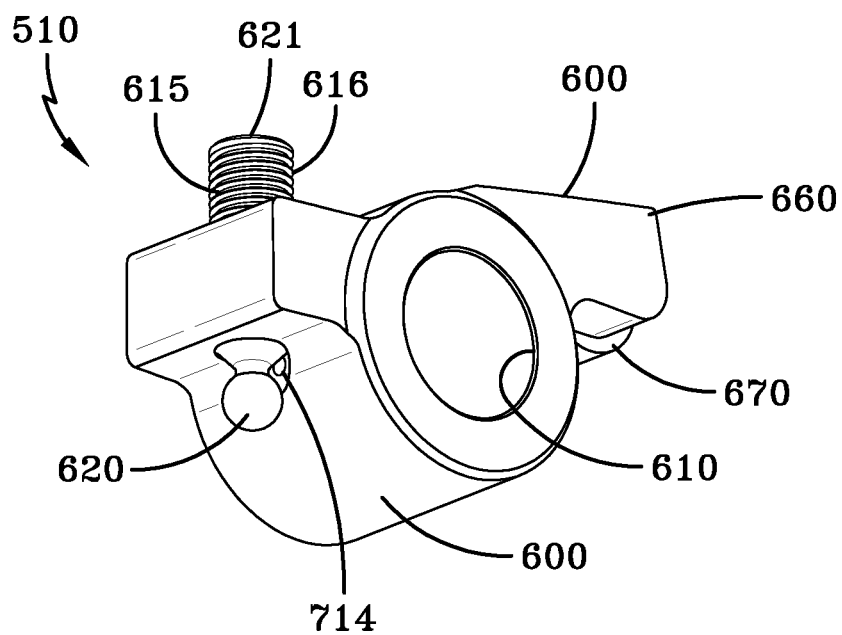
FIG. 19B is another perspective view of the rocker arm utilized by the modular cylinder head in accordance with the concepts of the various embodiments disclosed herein.

6. Rocker Arm Oil Port:

Each of the rocker arms 510, as shown in FIGS. 19A and 19B, include a rocker body 600 having a cylindrical mounting sleeve 610 that is dimensioned to receive the rocker shaft 360 therethrough, and upon which the rocker arm 510 is permitted to rotate or pivot. The body 600 also includes a receiving aperture 612 that carries therein a pushrod pivot member 615. In some embodiments, the pushrod pivot member 615 may be threadably carried in the receiving aperture 612 via threads 616, or may be fixed therein. The pushrod pivot member 615 includes a pivot 620 at one end, while in some embodiments, a keyed recess 621, such as in the form of a hexagonal or allen configuration for example, is provided at another end to facilitate adjustment. It should be appreciated that in some embodiments the pivot 620 may comprise a spherical or ball-shaped member. Substantially opposite to the pushrod pivot member 615 is a valve actuator arm 660, which may include a roller 670 that is configured to contact the valves in a manner to be discussed. Disposed through the rocker body 600 is a port 710 having terminal openings 712 and 714, whereby opening 712 opens into the sleeve 610 and opening 714 is positioned so as to open at a position that is adjacent or proximate to the pushrod pivot 620. Thus, oil delivered from the apertures 590 of the rocker shaft 360 is permitted to flow through the ports 710 of the rocker arms 510 to lubricate the area between the sleeve 610 and the rocker shaft 360.

Figure 20:
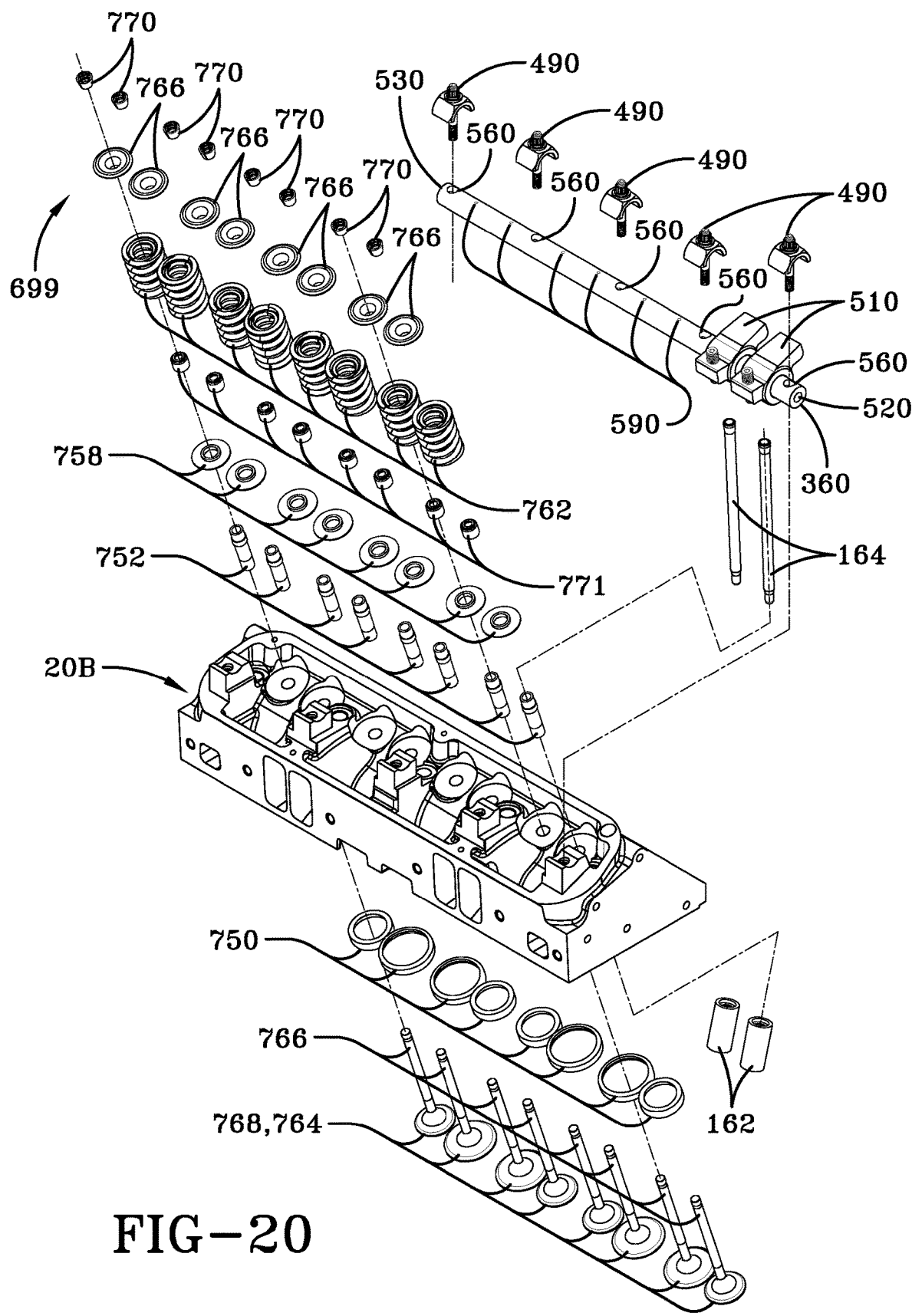
FIG. 20 is an exploded view of the modular cylinder head and associated valvetrain in accordance with the concepts of the various embodiments disclosed herein.
Figure 21:
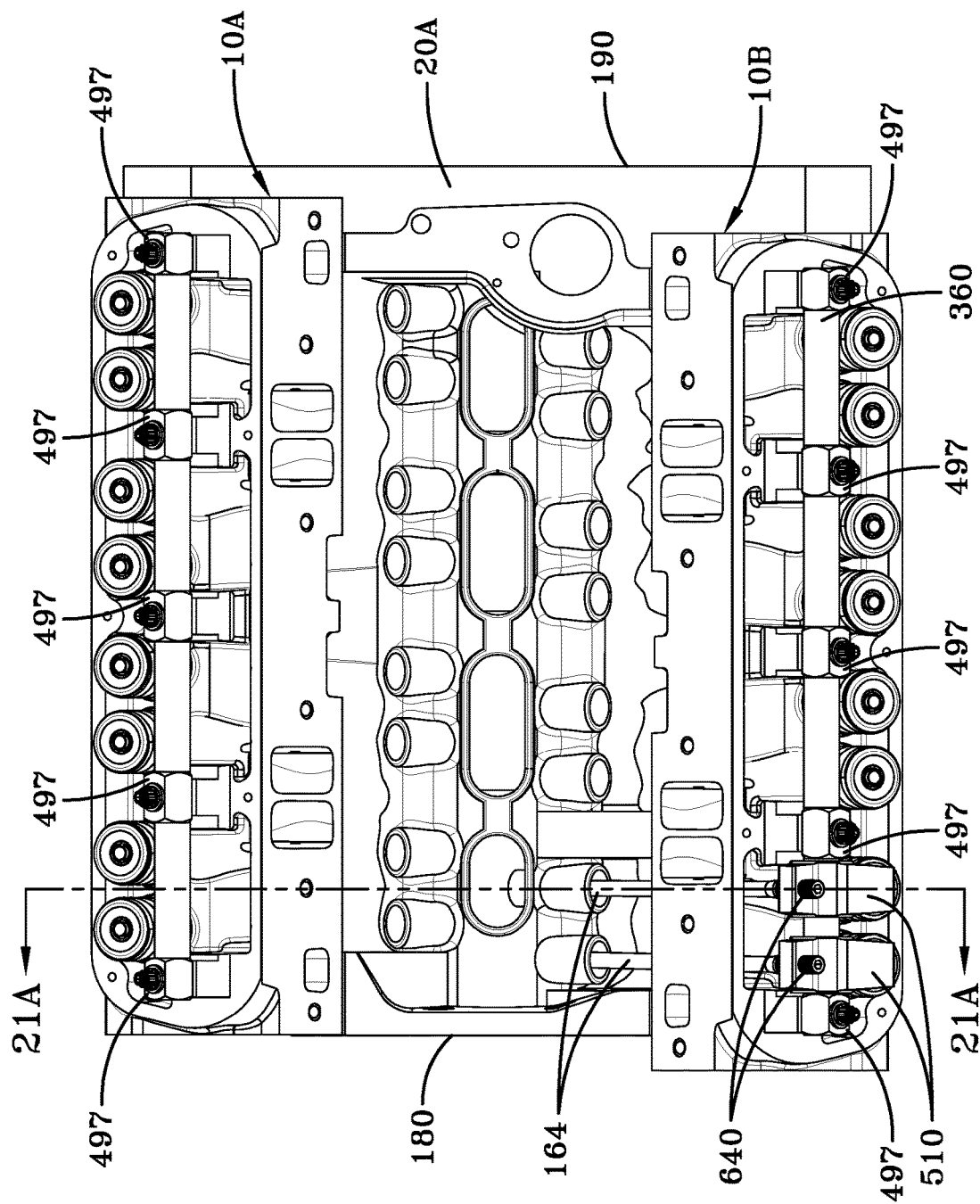
FIG. 21 is a top plan view of the modular cylinder heads attached to the "LA-style" engine block in accordance with the concepts of the various embodiments disclosed herein.
Figure 21A:
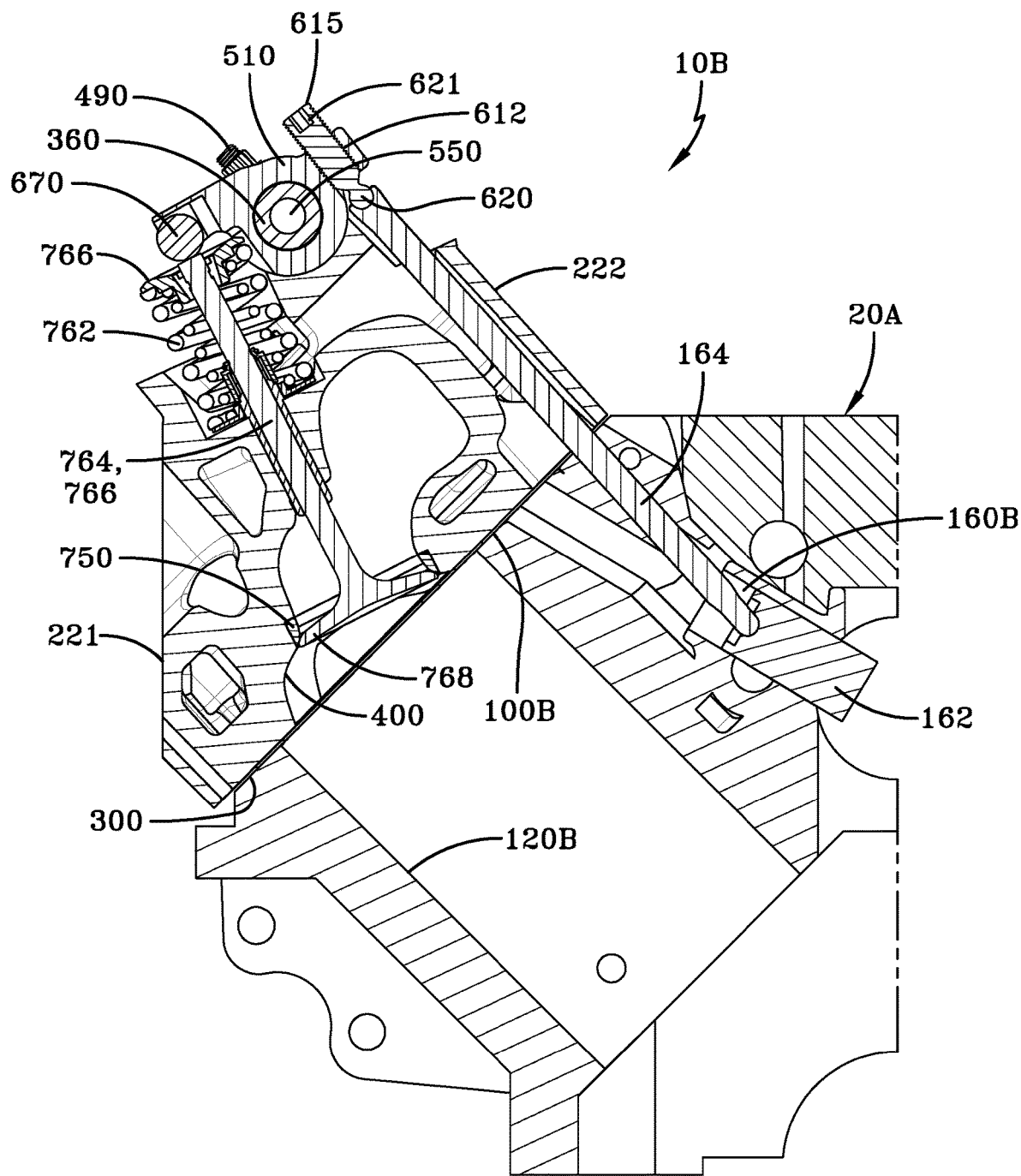
FIG. 21A is a cross-sectional view of the modular cylinder head attached to the "LA-style" engine block in accordance with the concepts of the various embodiments disclosed herein.

7. Valvetrain:

The head body 200 may be configured in some embodiments as a completed head assembly that includes an operative valvetrain 699, as shown in FIGS. 20-21A, which is ready for installation to the engine block 20A. In particular, the valvetrain 699 includes a valve seat 750 is positioned within the opening of the intake and exhaust ports 410 and 420. For the sake of brevity, the following discussion relates to each of the valve ports 410 and 420. In particular, a valve guide 752 is disposed within the valve bore 292 at a position that is proximate to the valvetrain portion 210 of the head body 200. A valve spring seat 758 is disposed adjacent to the valve spring seat surface 294, which together with a valve spring retainer cap 760, captures therebetween a valve spring 762. The valves 764 include a valve stem 766 and valve face 768. The valve stem 766 is positioned through the through the valve guide 752, and through each of the valve spring retainer seat 758 and the valve spring retainer cap 760. The valve stem 766 is retained to the valve spring retainer cap 760 by a retainer or clip 770. An optional oil seal 771 through which the valve stem 766 may be received is positioned proximate to the valve aperture. Accordingly, the valvetrain 699, and particularly the valves 764, selectively control the flow of intake air, in the case of the intake valves, through the intake ports 420 into the combustion chamber, and selectively control the flow of exhaust gases, in the case of the exhaust valves, from the combustion chamber and out of the exhaust ports 410.

C. Modular Cylinder Head and the "Magnum-Style" Engine Block:

It should be appreciated that the discussion of the cylinder head 10 as presented above with regard to the "LA-style" block 20A is equally applicable to that of the "Magnum-style" block 20B shown in FIGS. 22-25A, except that the oil outlet port 170 is not provided by the "Magnum-style" block 20B and, therefore, is not used. As such, the oil receiving port 450 of the head 10 is not utilized to deliver oil to the valvetrain 699 carried by the head 10. In other words, the heads 10A and 10B are attached to the "Magnum-style" block 20B in the same manner as in the "LA-style" block 20A, but the "Magnum-style" block 20B does not receive lubricating oil into the port 170 of the heads 10A and 10B. Rather, the "Magnum-style" head 20B delivers lubricating oil to the valvetrain 699 through a ported lifter or tappet 162', pushrod 164', rocker arm 510' and pushrod pivot member 615' as shown in FIGS. 22-25A.

Specifically, the lifter or tappet 162' includes a body 800 having one or more receiving ports 192AA disposed in an outer surface 812 thereof. Within the body 800 of the lifter 162' is a central port 192A that is in fluid communication with the one or more receiving ports 192AA. The central port 192A extends to an opening 830 disposed on a lifting surface 840 of the lifter 162'. The lifting surface 840 is configured to be in direct mechanical contact with an end the pushrod 164'.

The pushrod 164' includes an elongated body 850 terminated by ends 852 and 854. Disposed through the length of the body 850 is the elongated port 192B that is terminated at each end by openings 862 and 864 that are coterminous with the ends 852 and 854 of the pushrod 164'. As such, one end 852 of the pushrod 164' is configured to be carried upon the lifting surface 840 of the lifter 162'. The other end 854 of the pushrod 164' is configured to be placed in pivoting contact the pivot 620 of the rocker arm 510. It should be appreciated that in some embodiments, the end 854 of the pushrod 164,164' may have a concave surface to engage the pivot 620, which may comprise a spherical or ball-shaped surface. In addition, the end 852 of the pushrod 852 may have a convex surface.

The rocker arm 510' is structurally equivalent to the rocker arm 510 previously discussed; however the rocker arm 510' does not utilize the port 710, but rather uses an alternative port 710' having an opening 712' disposed in the sleeve 610 and another opening 714' that is disposed in the receiving aperture 612. It should be appreciated that the opening 714' may be elongated, such as to form an oval shape for example. In addition, the pushrod pivot member 615' is structurally equivalent to the pushrod pivot member 615, but includes an annular recess 900. The pushrod pivot member 615' also includes a longitudinally extending port 910 having an opening 912 disposed in the pivot 620. A laterally extending port 920 is fluidly coupled to the longitudinally extending port 910 at one end and has an opening 922 disposed at another end in the annular recess 900. It should be appreciated that the ports 910 and 920 may be one continuous port. Accordingly, the opening 922 is in fluid communication with the annular recess 900. As such, when the pushrod pivot member 615' is threaded into the receiving aperture 612, the annular recess 900 is moved to a position so that it is brought into fluid communication with the elongated opening 714' in the rocker arm body 600. This allows the opening 912 in the pushrod pivot member 615' to be in fluid communication with the opening 712' disposed in the sleeve 610.

During operation of the "Magnum-style" engine block 20B, the receiving ports 192AA of the lifter 162' are configured to receive oil, which may flow or be provided from the engine block 20B or other reservoir. The oil that enters into the one or more receiving ports 192AA enters the central port 192A and is routed out of the opening 830 in the lifting surface 840 of the lifter 162'. The oil exiting the opening 830 is fluidly communicated into the opening 862 provided by the end of the pushrod 164' that is carried on the lifting surface 840 of the lifter 162'. Oil then flows through the elongated pushrod port 192B, where it exits through the opening 864 that is proximate to the rocker arm 510' and enters into the opening 912 of the pivot 620 of the pushrod pivot member 615'. Oil then flows through the ports 910 and 920 and exits the opening 922 before entering the annular recess 900 of the pushrod pivot member 615'. Once within the annular recess 900, the oil flows into the elongated opening 714' of the port 710' and exits the opening 712' disposed in the sleeve 610 of the rocker arm 510' to lubricate the area between the rocker arm 510' and the rocker shaft 360, as well as the other parts of the valvetrain 699.

It should be appreciated that in alternative embodiments, the head body 200 and one or more of the rocker shaft 360, the rocker arms 510,510', the pushrod pivot members 615, 615', the lifters 162,162', the pushrods 164,164', the valvetrain 699 (or a portion of the components forming the valvetrain 699) and any suitable fasteners [bolt(s) 232, bolt(s) 490, caps 497] or accessories utilized by the head or used to attach the head to the block may be provided as separate components in a kit or in multiple kits. In some embodiments, at least two of the aforementioned components are preassembled and are provided in a kit, with the kit optionally including one or more other components. In alternative embodiments, the head body 200 and one or more of the valvetrain 699 (or a portion of the components forming the valvetrain 699), the rocker shaft 360, the rocker arms 510,510', the pushrod pivot members 615,615', the lifters 162,162', the pushrods 164,164', and any suitable fasteners or accessories utilized by the head or used to attach the head to the block may be provided together as a pre-assembled unit or assembly.

It should also be appreciated that while the following discussion presents the head 10 as being configured for use with lubricating oil, the head 10 may be utilized with any liquid or flowable compound or formulation suitable for lubricating combustion engines and parts thereof, such as engine blocks 20A-B.

Therefore, it can be seen that the objects of the various embodiments disclosed herein have been satisfied by the structure and its method for use presented above. While in accordance with the Patent Statutes, only the best mode and preferred embodiments have been presented and described in detail, with it being understood that the embodiments disclosed herein are not limited thereto or thereby. Accordingly, for an appreciation of the true scope and breadth of the embodiments, reference should be made to the following claims.

What is claimed is:

1. A cylinder head for an engine block having an oil outlet port disposed in a cylinder bank face, the cylinder head comprising:
   a cylinder head including a combustion side configured to be placed adjacent to the cylinder bank of the engine block and a valve side adapted to carry a valvetrain, wherein a receiving opening is disposed in said combustion side of said head,
   a rocker shaft mounting bore disposed in the cylinder head, said rocker shaft mounting bore having a delivery opening disposed therein;
   a head mounting bore disposed through said cylinder head, wherein said head mounting bore is separate from said receiving opening;
   a receiving port fluidly connected at one end to said head mounting bore and fluidly connected at another end to said receiving opening: and
   a delivery port fluidly connecting said head mounting bore to said delivery opening in said rocker shaft mounting bore.

2. The cylinder head of claim 1, wherein said head mounting bore is configured to receive a head bolt, such that said head mounting bore and said head bolt form a head passage therebetween that fluidly couples said receiving port and said delivery port.

3. The cylinder head of claim 2, wherein said rocker shaft mounting bore is configured to receive a rocker shaft bolt, such that said rocker shaft mounting bore and said rocker shaft bolt form a rocker outlet passage therebetween that is in fluid communication with said delivery opening.

4. The cylinder head of claim 3, wherein said rocker shaft mounting bore is disposed in a boss extending from said cylinder head.

5. The cylinder head of claim 4, wherein said boss includes a concave surface.

6. The cylinder head of claim 3, further comprising: a rocker shaft having an elongated cavity extending there through;
   one or more outlet apertures disposed through said rocker shaft and in fluid communication with said elongated cavity;
   a rocker shaft mounting aperture disposed through said rocker shaft, said rocker shaft bolt received through said rocker shaft mounting aperture and attached to said rocker shaft mounting bore, wherein said rocker shaft mounting aperture and said rocker shaft bolt form a rocker inlet passage therebetween that is in fluid communication with said elongated cavity, and wherein said rocker inlet passage is in fluid communication with said rocker outlet passage; and
   one or more rocker arms having a body including a sleeve to pivotably receive said rocker shaft, and a port having a first opening and a second opening, wherein said first opening is disposed in said sleeve, and said second opening opens to an outside of said one or more rocker arms.

7. The cylinder head of claim 6, wherein said rocker shaft mounting bore is disposed in a boss that extends from said head.

8. The cylinder head of claim 7, wherein said boss includes a concave surface upon which said rocker shaft is carried.

9. The cylinder head of claim 6, further comprising a valvetrain carried by said valve side of said cylinder head.

10. The cylinder head of claim 6, wherein said second opening is disposed on an outer surface of said body of said one or more rocker arms.

11. The cylinder head of claim 6, wherein said second opening is disposed in a receiving aperture disposed in said body of said one or more rocker arms, the cylinder head further comprising:
    a pushrod pivot member received within said receiving aperture, said pushrod pivot member having a pivot end adapted to be placed in operative communication with one end of a pushrod, said pushrod pivot member having a port that fluidly couples an opening disposed in said pivot end to an opening opens to outside of said pushrod pivot member body that is in fluid communication with said second opening of said one or more rocker arms.

12. The cylinder head of claim 11, wherein said pushrod pivot member is threadably received in said receiving aperture.

13. The cylinder head of claim 11, wherein said opening that opens to outside of said pushrod pivot member body is disposed in an annular recess.

14. The cylinder head of claim 11, wherein said second opening is elongated.

15. A cylinder head for an engine block comprising:
    a cylinder head including a combustion side configured to be placed adjacent to a cylinder bank of the engine block and a valve side adapted to carry a valvetrain, wherein a receiving opening is disposed in said combustion side of said head;
    a rocker shaft mounting bore disposed in the cylinder head, said rocker shaft mounting bore having a delivery opening disposed therein;
    a head mounting bore disposed through said cylinder head, said head mounting bore separate from said receiving opening;
    a receiving port fluidly connecting said receiving opening to said head mounting bore; and
    a delivery port fluidly connecting said head mounting bore to said delivery opening in said rocker shaft mounting bore.

16. The cylinder head of claim 15, wherein said head mounting bore is configured to receive a head bolt, such that said head mounting bore and said head bolt form a head passage therebetween that fluidly couples said receiving port and said delivery port.

17. The cylinder head of claim 16, wherein said delivery opening rocker shaft mounting bore is disposed adjacent to a concave surface provided by said cylinder head.

18. The cylinder head of claim 17, wherein said delivery opening includes a port bore concentric to said rocker shaft retention bore, wherein said port bore has a diameter greater than said rocker shaft retention bore,
wherein said delivery opening is disposed in said port bore.

19. The cylinder head of claim 18, further comprising:
a rocker shaft having an elongated cavity extending there through;
one or more outlet apertures disposed through said rocker shaft and in fluid communication with said elongated cavity;
a rocker shaft mounting aperture disposed through said rocker shaft, a rocker shaft bolt received through said rocker shaft mounting aperture and attached to said rocker shaft mounting bore, wherein said rocker shaft mounting aperture and said rocker shaft bolt form a rocker inlet passage therebetween that is in fluid communication with said elongated cavity, and wherein said rocker inlet passage is in fluid communication with said port bore; and
a rocker arm having a body including a sleeve to pivotably receive said rocker shaft, and a port having a first opening and a second opening, wherein said first opening is disposed in said sleeve, and said second opening opens to an outside of said rocker arm.

20. The cylinder head of claim 19, wherein said rocker shaft mounting bore is disposed in a boss that extends from said head.

21. The cylinder head of claim 20, wherein said boss includes a concave surface upon which said rocker shaft is carried.

22. The cylinder head of claim 21, further comprising a valvetrain carried by said valve side of said cylinder head.

23. The cylinder head of claim 22, further comprising:
a lifter having at least an inlet port and an outlet port;
a pushrod having a pushrod cavity extending each end thereof, wherein said push rod cavity is configured to be in fluid communication with said outlet port of said lifter at one end and in operative contact with said rocker arm at another end.

24. A cylinder head kit for an engine block comprising: a cylinder head, including:
a combustion side configured to be placed adjacent to a cylinder bank of the engine block and a valve side adapted to carry a valvetrain, wherein a receiving opening is disposed in said combustion side of said head;
a rocker shaft mounting bore disposed in a concave surface of said cylinder head;
a port bore adjacent to said concave surface and concentric with said rocker shaft mounting bore, wherein said port bore has a diameter greater than said rocker shaft retention bore, and wherein a delivery opening is disposed in said port bore;
a head mounting bore disposed through said cylinder head and separate from said receiving opening;
a receiving port fluidly connecting said receiving opening to said head mounting bore; and
a delivery port fluidly connecting said head mounting bore to said delivery opening in said rocker shaft mounting bore;
wherein said head mounting bore is configured to receive a head bolt, such that when said head bolt is received therein, said head mounting bore and said head bolt form a head passage therebetween that fluidly couples said receiving port and said delivery port; and
wherein said rocker shaft mounting bore is configured to receive a rocker shaft bolt, such that when said rocker shaft bolt is received therein, said port bore and said rocker shaft bolt form a rocker outlet passage therebetween that is in fluid communication with said delivery opening;
a rocker shaft having an elongated cavity extending therethrough, said cavity in fluid communication with one or more outlet apertures, a rocker shaft mounting aperture disposed through said rocker shaft and configured to receive said rocker shaft bolt for attachment to said rocker shaft mounting bore, wherein said rocker shaft mounting aperture and said rocker shaft bolt form a rocker inlet passage therebetween that is in fluid communication with said elongated cavity, and that is in fluid communication with said rocker outlet passage;
a first rocker arm having a first body including a sleeve configured to pivotably receive said rocker shaft, and a port having a first opening and a second opening, wherein said first opening is disposed in said sleeve, and said second opening opens to an outside of said rocker arm, said first rocker arm including a first receiving aperture disposed in said first body;
a first pushrod pivot member configured to be received with said first receiving aperture, said first pushrod pivot member adapted to be placed in operative communication with a pushrod;
a second rocker arm having a second body including a sleeve configured to pivotably receive said rocker shaft, and a port having a first opening and a second opening, wherein said first opening is disposed in said sleeve, and said second opening is disposed in a second receiving aperture disposed in said second body of said second rocker arm;
a second pushrod pivot member configured to be received within said second receiving aperture, said second pushrod pivot member having a pivot end, said pushrod pivot member having a port that fluidly couples an opening disposed in said pivot end to an opening that opens to outside of said second pushrod pivot member body so as to be in fluid communication with said second opening of said second rocker arm;
a lifter having at least one inlet in fluid communication with at least one outlet, said at least one outlet disposed in a lifting surface; and
a pushrod having a cavity that extends between a first opening and a second opening disposed in respective ends of said pushrod, wherein one of said outlets of said lifter is configured to be placed adjacent to said first opening of said pushrod, and wherein said pushrod is adapted to be placed in operative communication with said pivot end of said second pushrod pivot member.

25. The kit of claim 24, wherein when the engine block includes a cylinder bank face having an oil outlet port, only said cylinder head, said rocker shaft, said first rocker arm and said first pushrod pivot member are used, and when the engine block does not include a cylinder bank face having an oil outlet port, only said cylinder head, said lifter, said second rocker arm, said second pushrod pivot member, and said pushrod are used.

* * * * *

UNITED STATES PATENT AND TRADEMARK OFFICE
CERTIFICATE OF CORRECTION

| | | |
|---|---|---|
| PATENT NO. | : 11,067,030 B2 | Page 1 of 1 |
| APPLICATION NO. | : 16/673459 | |
| DATED | : July 20, 2021 | |
| INVENTOR(S) | : Cory M. Roth and Brian S. Jenior | |

It is certified that error appears in the above-identified patent and that said Letters Patent is hereby corrected as shown below:

In the Claims

At Column 13, Claim 1, Line 34, replace "head," with -- head; --

At Column 13, Claim 1, Line 43, replace "opening:" with -- opening; --

At Column 15, Claim 17, Line 5, reading "opening rocker shaft mounting bore is disposed adjacent to" should read -- opening is disposed adjacent to --

At Column 15, Claim 23, Line 46, replace "push rod" with -- pushrod --

Signed and Sealed this
Twenty-second Day of November, 2022

Katherine Kelly Vidal
*Director of the United States Patent and Trademark Office*